US012798605B2

(12) United States Patent
Kato et al.

(10) Patent No.: US 12,798,605 B2
(45) Date of Patent: Nov. 17, 2026

(54) DRIVER ASSISTANCE USING FORCE SENSE STIMULATION ADJUSTED BASED ON DRIVING SCENE AND DRIVER STATE

(71) Applicant: SUBARU CORPORATION, Tokyo (JP)

(72) Inventors: Riku Kato, Tokyo (JP); Noeru Sato, Tokyo (JP); Yuki Mizuhara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 25 days.

(21) Appl. No.: 19/052,836

(22) Filed: Feb. 13, 2025

(65) Prior Publication Data

US 2025/0178635 A1 Jun. 5, 2025

Related U.S. Application Data

(63) Continuation of application No. PCT/JP2023/027806, filed on Jul. 28, 2023.

(51) Int. Cl.
*B60W 50/16* (2020.01)

(52) U.S. Cl.
CPC ....... *B60W 50/16* (2013.01); *B60W 2540/223* (2020.02)

(58) Field of Classification Search
CPC ........................ B60W 50/16; B60W 2540/223
See application file for complete search history.

(56) References Cited

U.S. PATENT DOCUMENTS

2018/0037236 A1* 2/2018 Yamaguchi .............. A47C 7/62
2022/0016998 A1 1/2022 Kusayanagi et al.
2022/0097603 A1* 3/2022 Hato ........................ B60Q 9/00

FOREIGN PATENT DOCUMENTS

JP 2009-274673 A 11/2009
JP 2020056933 A * 4/2020
WO 2020/095082 A1 5/2020

OTHER PUBLICATIONS

International Search Report received in PCT Application No. PCT/JP2023/027806, dated Sep. 5, 2023.

* cited by examiner

*Primary Examiner* — Steven Vu Nguyen
(74) *Attorney, Agent, or Firm* — Rimon P.C.

(57) ABSTRACT

A driver assistance system includes one or more processors and one or more memories. The one or more processors perform driving scene detection processing of detecting a current driving scene in a vehicle or a driving scene predicted in the future in the vehicle, perform driver state detection processing of detecting a state of a driver, repetitively perform, as stimulation output control processing, an output control of stimulation by a force sense presenter, while adjusting a quantity of stimulation based on the detected driving scene and the detected state of the driver, and perform registration processing of registering the quantity of stimulation finally adjusted by repetitively performing the driver state detection processing and the stimulation output control processing, and the state of the driver before and after an output of the stimulation, in the one or more memories in association with the driving scene and the driver.

12 Claims, 7 Drawing Sheets

DRIVER ASSISTANCE USING FORCE SENSE STIMULATION ADJUSTED BASED ON DRIVING SCENE AND DRIVER STATE

CROSS-REFERENCE TO RELATED APPLICATIONS

This application is continuation of International Application No. PCT/JP2023/027806, filed on Jul. 28, 2023, the entire contents of which are hereby incorporated by reference.

BACKGROUND

The disclosure relates to a driver assistance system, a vehicle, a non-transitory computer-readable recording medium containing a program, and a driver assistance method.

In recent years, as to travel of vehicles, research has been made for techniques of controlling a driver's posture to stabilize a track of a vehicle, to lead the driver to appropriately driving the vehicle, to suppress car sickness of the driver as well as other occupants.

SUMMARY

An aspect of the disclosure provides a driver assistance system. The driver assistance system is configured to control a quantity of stimulation and control an force sense presenter configured to give a force sense by stimulation to a body of a driver, and assist the driver in driving a vehicle. The driver assistance system includes: one or more processors; and one or more memories communicably coupled to the one or more processors. The one or more processors are configured to perform driving scene detection processing of detecting a current driving scene in the vehicle or a driving scene predicted in the future in the vehicle, perform driver state detection processing of detecting a state of the driver, repetitively perform, as stimulation output control processing, an output control of the stimulation by the force sense presenter, while adjusting the quantity of stimulation based on the detected driving scene and the detected state of the driver, and perform registration processing of registering the quantity of stimulation finally adjusted by repetitively performing the driver state detection processing and the stimulation output control processing, and the state of the driver before and after an output of the stimulation, in the one or more memories in association with the driving scene and the driver.

An aspect of the disclosure provides a vehicle. The vehicle is provided with a driver assistance system configured to control a quantity of stimulation and control a force sense presenter configured to give a force sense by stimulation to a body of a driver, and assist the driver in driving a vehicle. The driver assistance system includes: one or more processors; and one or more memories communicably coupled to the one or more processors. The one or more processors are configured to: perform driving scene detection processing of detecting a current driving scene in the vehicle or a driving scene predicted in the future in the vehicle; perform driver state detection processing of detecting a state of the driver; repetitively perform, as stimulation output control processing, an output control of the stimulation by the force sense presenter, while adjusting the quantity of stimulation based on the detected driving scene and the detected state of the driver; and perform registration processing of registering the quantity of stimulation finally adjusted by repetitively performing the driver state detection processing and the stimulation output control processing, and the state of the driver before and after an output of the stimulation, in the memories in association with the driving scene and the driver.

An aspect of the disclosure provides a non-transitory computer-readable recording medium containing a program for a driver assistance system configured to control a quantity of stimulation and control a force sense presenter configured to give a force sense by stimulation to a body of a driver, and assist the driver in driving a vehicle. The program causes, when executed by a computer, the computer to implement a method, the method including: performing driving scene detection processing of detecting a current driving scene in the vehicle or a driving scene predicted in the future in the vehicle; performing driver state detection processing of detecting a state of the driver; repetitively performing, as stimulation output control processing, an output control of the stimulation by the force sense presenter, while adjusting the quantity of stimulation based on the detected driving scene and the detected state of the driver; and performing registration processing of registering the quantity of stimulation finally adjusted by repetitively performing the driver state detection processing and the stimulation output control processing, and the state of the driver before and after an output of the stimulation, in one or more memories in association with the driving scene and the driver.

An aspect of the disclosure provides a driver assistance method. The driver assistance method includes controlling a quantity of stimulation and controlling a force sense presenter configured to give a force sense by stimulation to a body of a driver, and assisting the driver in driving a vehicle. The driver assistance method includes: performing driving scene detection processing of detecting a current driving scene in the vehicle or a driving scene predicted in the future in the vehicle; performing driver state detection processing of detecting a state of the driver; repetitively performing, as stimulation output control processing, an output control of the stimulation by the force sense presenter, while adjusting the quantity of stimulation based on the detected driving scene and the detected state of the driver; and performing registration processing of registering the quantity of stimulation finally adjusted by repetitively performing the driver state detection processing and the stimulation output control processing, and the state of the driver before and after an output of the stimulation, in one or more memories in association with the driving scene and the driver.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
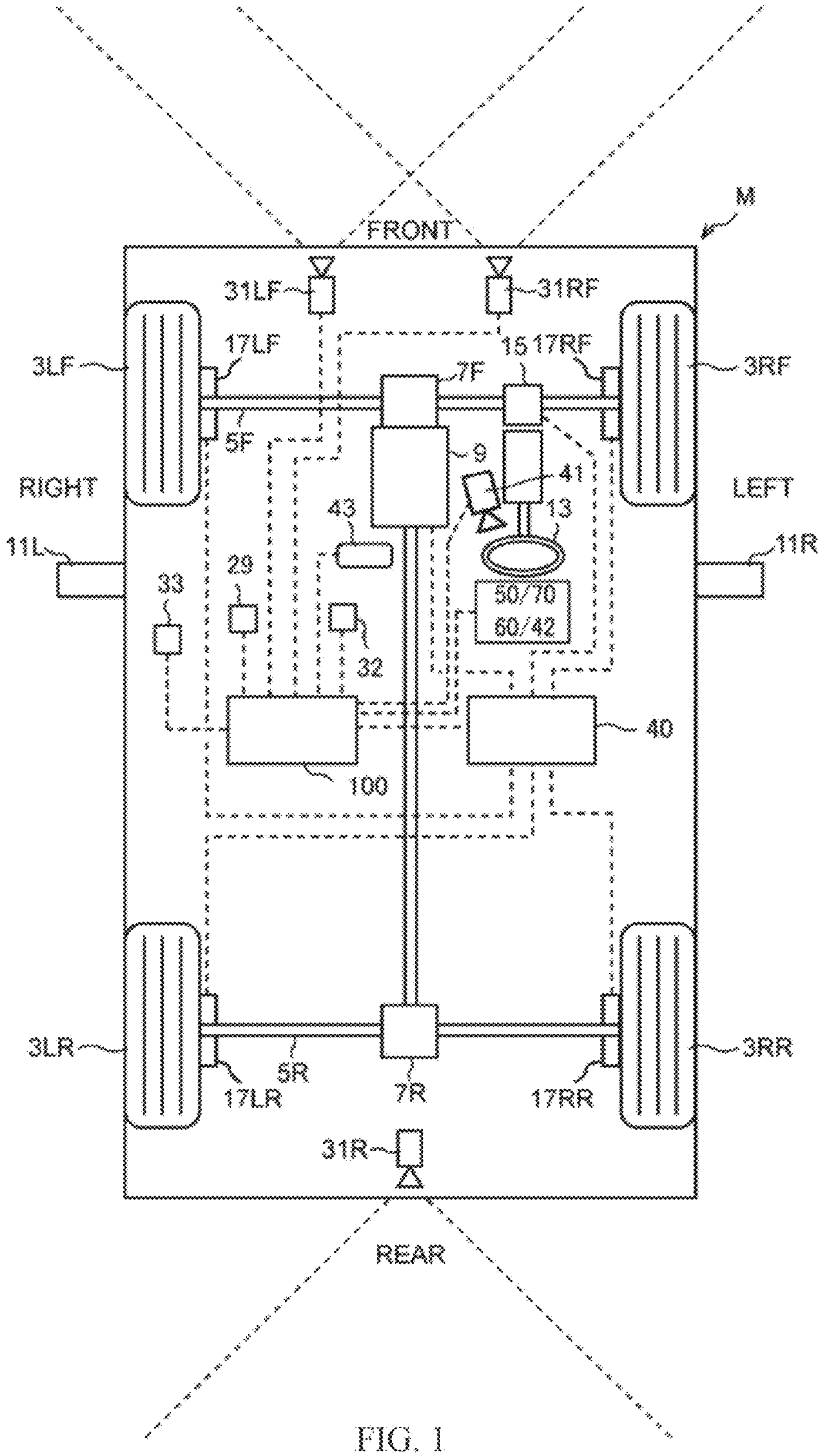
FIG. 1 is a schematic diagram of a configuration example of a vehicle according to an embodiment of the disclosure.

Recently, as described in International Patent Application Publication WO 2020/095082 A1, a device has been known that predicts a motion of a vehicle and provides stimulation that generates muscle tone to lead a driver to take a posture corresponding to the motion of the vehicle. Moreover, as described in Japanese Unexamined Patent Application Publication (JP-A) No. 2009-274673, a device has been known that controls a driver's seat to lead a driver to an appropriate driving posture.

However, the devices, etc. described in WO 2020/095082 A1 and JP-A No. 2009-274673 do not detect a situation of the driver and do not make various kinds of controls of a driving posture in line with the situation of the driver. Accordingly, the devices, etc. described in WO 2020/095082 A1 and JP-A No. 2009-274673 sometimes fail in leading the driver to an appropriate driving posture.

It is desirable to provide a driver assistance system, a vehicle, a non-transitory computer-readable recording medium containing a program, and a driver assistance method that make it possible to lead a driver who drives a vehicle to an appropriate driving posture in line with each of a travel state of the vehicle and a state of the driver.

[A] FEATURES OF EMBODIMENTS OF THE DISCLOSURE (1) An embodiment of the disclosure has a configuration as follows.

A driver assistance system configured to control a quantity of stimulation and control a force sense presenter configured to give a force sense by stimulation to a body of a driver, and assist the driver in driving a vehicle, the driver assistance system including:

one or more processors; and one or more memories communicatably coupled to the one or more processors, in which the one or more processors are configured to perform driving scene detection processing of detecting a current driving scene in the vehicle or a driving scene predicted in the future in the vehicle, perform driver state detection processing of detecting a state of the driver, repetitively perform, as stimulation output control processing, an output control of the stimulation by the force sense presenter, while adjusting the quantity of stimulation based on the detected driving scene and the detected state of the driver, and perform registration processing of registering the quantity of stimulation finally adjusted by repetitively performing the driver state detection processing and the stimulation output control processing, and the state of the driver before and after an output of the stimulation, in the one or more memories in association with the driving scene and the driver.

It is to be noted that the embodiment of the disclosure is implementable by a vehicle including the driver assistance system configured to perform each processing mentioned above, a non-transitory computer-readable recording medium containing a program to perform each processing mentioned above, or a driver assistance method including performing each processing mentioned above.

With this configuration, in the driver assistance system of the disclosure, based on each of the detected state of the vehicle and the detected state of the driver, it is possible to lead the driver to an appropriate state when driving the vehicle, e.g., a posture of the driver, a direction of the face of the driver, a position of the head of the driver, and a direction of the head of the driver.

That is, in the driver assistance system of the disclosure, it is possible to lead the driver who drives the vehicle to the appropriate state in line with each of the travel state of the vehicle and the state of the driver.

For example, in the driver assistance system of the disclosure, even when the driver is accustomed to the stimulation to control the driver's driving posture, it is possible to appropriately change the quantity of stimulation. Hence, it is possible to continuously lead the driver to the appropriate driving posture.

Moreover, for example, in the driver assistance system of the disclosure, even when drivers having different driving characteristics or drivers having different physical constitutions drive the vehicle, it is possible to appropriately change the quantity of stimulation. Hence, it is possible to lead each driver to the appropriate driving posture.

Accordingly, in the driver assistance system of the disclosure, it is possible to not only suppress car sickness for many drivers but also enhance their driving skills, leading to safer driving.

It is to be noted that a "force sense presenter" refers to, for example, a driver's seat, or in-vehicle equipment configured to come in contact with a driver such as a seat belt, or a wearable device such as a goggle-shaped, wear-shaped, or belt-shaped device. However, in one example, the force sense presenter may cooperate with a controller configured to control the vehicle.

A "driving scene" refers to, for example, a motion of a vehicle accompanying driving behavior by a driver such as a left turn or a right turn, parking or stopping a vehicle, a lane change, or merging. The "driving scene" may be a concept including a place where the motion of the vehicle has occurred, e.g., an intersection, a merging point, or an expressway.

A "state of a driver" refers to, for example, a posture and behavior of the driver including a turning state of, for example, the upper body or the head only, a movement of a gaze, a change in the position of the head, and the like.

"Detection of the state of the driver" means, for example, analysis by an in-vehicle camera provided in a vehicle or detection of a seated state of the driver on the driver's seat.

(2) Moreover, in the embodiment of the disclosure, the one or more processors may be configured to perform determination processing of determining whether the detected state of the driver is an ideal state defined in advance based on the driving scene, and when it is determined in the determination processing that the detected state of the driver is out of the ideal state, adjust the quantity of stimulation to be given to the driver by the force sense presenter, and repetitively perform the stimulation output control processing of controlling the output of the force sense presenter based on the adjusted quantity of stimulation, together with the driver state detection processing and the determination processing.

With this configuration, in the driver assistance system of the disclosure, it is possible to easily lead the driver to the appropriate state if the state of the driver when driving the vehicle is defined in advance as the ideal state, e.g., the posture of the driver, the direction of the face of the driver, the position of the head of the driver, and the direction of the head of the driver.

It is to be noted that the "ideal state" includes, for example, an appropriate posture of the driver, an appropriate direction of the face of the driver, an appropriate position of the head of the driver, and an appropriate direction of the head of the driver, and the like.

(3) Moreover, in the embodiment of the disclosure,
in a case where the ideal state is held in the one or more memories in association with the driving scene, for each driver or for each attribute of the driver,
the one or more processors may be configured to,
when it is determined in the determination processing that the detected state of the driver is out of the ideal state, perform the stimulation output control processing based on the ideal state of the driver as a target of driver assistance or the ideal state held in association with the attribute of the driver, and the detected driving scene.

With this configuration, in the driver assistance system of the disclosure, it is possible to control the state of the driver in the current driving scene based on a previous driving scene or the state of a driver having the same tendency. Hence, it is possible to enhance reproducibility in the state of the driver.

Accordingly, in the driver assistance system of the disclosure, it is possible to easily lead the driver to the ideal state. It is also possible to not only suppress car sickness for many drivers but also enhance their driving skills, leading to safer driving.

It is to be noted that an "attribute of the driver" may include, for example, gender, age, personality, physical information such as a height, a skeleton, and the like, and that which is related to the driver, e.g., a driving style and the sense of burden of driving.

The "ideal state held in association with the attribute of the driver" includes not only the ideal state when the attribute of the driver is the same, but also the ideal state when the attribute is regarded as the same.

For example, the "case where the attribute is regarded as the same" includes not only a case where the attribute is exactly the same but also a case where the attribute is similar. For example, the "case where the attribute of the driver is the same or regarded as the same" includes not only a case where the age is the same but also a case where the generation is the same, or a case where the age is a reference age or an age within a certain range (e.g., ±5 years).

(4) Moreover, in the embodiment of the disclosure,
the one or more processors may be configured to
perform vehicle state detection processing of detecting a state of the vehicle, and
perform the driving scene detection processing based on the state of the vehicle.

With this configuration, in the driver assistance system and the like of the disclosure, it is possible to detect the driving scene by using the state of the vehicle that has a large influence on the driving scene. Hence, it is possible to generate the driving scene more accurately.

[B] DETAILS OF EMBODIMENTS OF THE DISCLOSURE

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

[B1] VEHICLE

Figure 4:
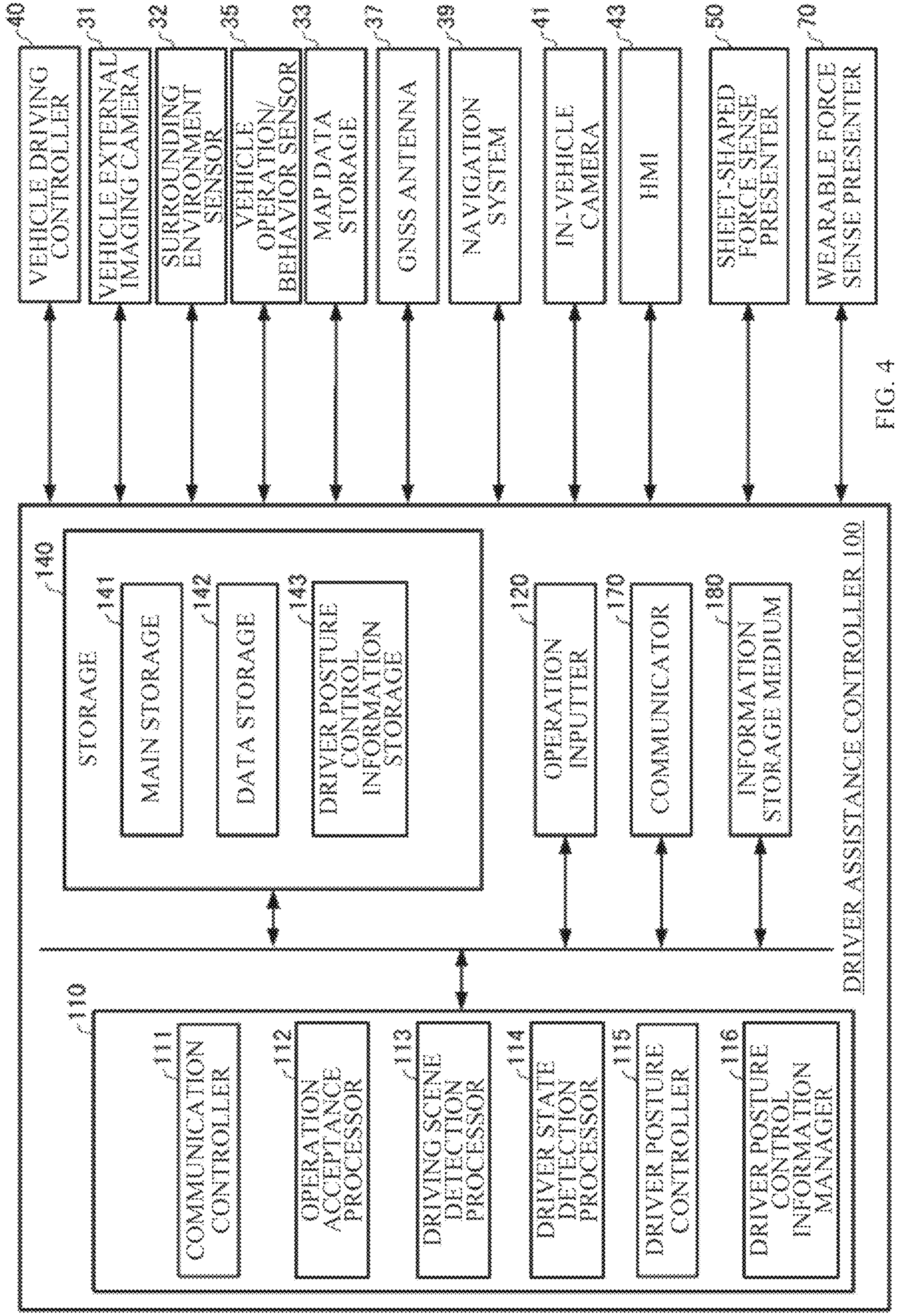
FIG. 4 is an example of a system configuration diagram of a configuration of a driver assistance controller to be mounted on the vehicle according to the embodiment.

First, with reference to FIGS. 1 and 4, description is given of a vehicle M of an embodiment.

It is to be noted that FIG. 1 is a schematic diagram of a configuration example of the vehicle M of the embodiment. FIG. 4 is an example of a system configuration diagram of a configuration of a driver assistance controller 100 mounted on the vehicle M of the embodiment.

(Basic Configuration of Vehicle)

As illustrated in FIG. 1, the vehicle M may include a driving force source 9 configured to generate driving torque of the vehicle M. The vehicle M is configured to transmit the driving torque outputted from the driving force source 9 to wheels 3.

For example, the vehicle M may include a four-wheel drive vehicle configured to transmit the driving torque to a left front wheel 3LF, a right front wheel 3RF, a left rear wheel 3LR, and a right rear wheel 3RR.

The driving force source 9 may be an internal combustion engine such as a gasoline engine or a diesel engine, or may be a driving motor, or may include both an internal combustion engine and a driving motor.

The vehicle M may be, for example, an electric vehicle including two driving motors, i.e., a front wheel driving motor and a rear wheel driving motor. Alternatively, the vehicle M may be an electric vehicle including driving motors corresponding to the respective wheels 3.

It is to be noted that when the vehicle M is an electric vehicle or a hybrid electric vehicle, the vehicle M may include a secondary battery and a generator such as a motor or a fuel cell. The secondary battery may accumulate electric power to be supplied to a driving motor. The generator may generate electric power to be charged in the battery.

As illustrated in FIG. 1, the vehicle M may include the driving force source 9, an electric steering device 15, and brake devices 17LF, 17RF, 17LR, and 17RR (hereinafter, collectively referred to as "brake devices" when distinction is not particularly necessary) as devices to be used for a driving control of the vehicle.

The driving force source 9 may output the driving torque to be transmitted to a front wheel drive shaft 5F and a rear wheel drive shaft 5R through an unillustrated transmission, a front wheel differential mechanism 7F, and a rear wheel differential mechanism 7R.

Driving of the driving force source 9 and the transmission may be controlled by a vehicle driving controller 40 including one or more electronic control units (ECU).

The electric steering device 15 may be provided on the front wheel drive shaft 5F. The electric steering device 15 may include an unillustrated electric motor and an unillustrated gear mechanism. The electric steering device 15 may be controlled by the vehicle driving controller 40 to adjust steering angles of the left front wheel 3LF and the right front wheel 3RF.

In manual driving, the vehicle driving controller 40 may control the electric steering device 15 based on a steering wheel angle of a steering wheel 13 by the driver.

The brake devices 17LF, 17RF, 17LR, and 17RR may apply braking forces respectively to the left front wheel 3LF, the right front wheel 3RF, the left rear wheel 3LR, and the right rear wheel 3RR.

The brake devices 17 may each include, for example, a hydraulic brake device. Hydraulic pressure to be supplied to each of the brake devices 17 may be controlled by the vehicle driving controller 40 to generate a predetermined braking force.

It is to be noted that when the vehicle M is an electric vehicle or a hybrid electric vehicle, the brake devices 17 may be used in combination with a regenerative brake by a driving motor.

The vehicle driving controller 40 may include one or more electronic control units configured to control the driving of the driving force source 9, the electric steering device 15, and the brake devices 17. The vehicle driving controller 40 is configured to control the driving of the transmission. The transmission is configured to perform, as necessary, shifting of an output outputted from the driving force source 9 and transmit the resultant output to the wheels 3.

(Vehicle External Imaging Camera)

The vehicle external imaging camera 31 may be a camera configured to acquire information regarding surrounding environment of the vehicle M, and include front imaging cameras 31RF and 31LF, and a rear imaging camera 31R.

For example, the front imaging cameras 31RF and 31LF, and the rear imaging camera 31R may include an imaging element such as CCD (Charged-Coupled Devices) or CMOS (Complementary Metal-Oxide-Semiconductor).

The front imaging cameras 31RF and 31LF, and the rear imaging camera 31R may capture a forward view or a rearward view of the vehicle M, generate image data, and provide the generated image data to the driver assistance controller 100.

It is to be noted that the front imaging cameras 31RF and 31LF constitute a stereo camera including a pair of right and left cameras, and the rear imaging camera 31R constitutes a so-called monocular camera. However, they may each be either a stereo camera or a monocular camera.

Instead of or in addition to the front imaging cameras 31RF and 31LF, and the rear imaging camera 31R, for example, cameras provided on side mirrors 11R and 11L may be provided. The cameras may capture a right rearward view or a left rearward view.

(Surrounding Environment Sensor)

The surrounding environment sensor 32 may be a sensor configured to detect persons and obstacles around the vehicle M. For example, the surrounding environment sensor 32 may include any one or more sensors out of a high frequency radar sensor, an ultrasonic sensor, and LIDAR.

For example, the surrounding environment sensor 32 is configured to detect any object present around the vehicle M such as random vehicles or bicycles, buildings, electric poles, traffic signs, traffic lights, natural objects, or other obstacles.

The surrounding environment sensor 32 may transmit a sensor signal including detected data to the driver assistance controller 100.

(Vehicle Operation/Behavior Sensor)

The vehicle operation/behavior sensor 35 may include one or more sensors configured to detect an operation state and behavior of the vehicle M.

For example, the vehicle operation/behavior sensor 35 may include one or more of a vehicle speed sensor, an acceleration rate sensor, and an angular velocity sensor, and detect information regarding the behavior of the vehicle M such as a vehicle speed, a longitudinal acceleration rate, a lateral acceleration rate, and a yaw rate.

For example, the vehicle operation/behavior sensor 35 may include one or more of an accelerator position sensor, a brake stroke sensor, a brake pressure sensor, a steering angle sensor, an engine speed sensor, a brake lamp switch, and a turn signal lamp switch.

The vehicle operation/behavior sensor 35 may detect information regarding the operation state of the vehicle such as the steering wheel angle of the steering wheel 13 or the steering angles of steered wheels, accelerator opening, an amount of a brake operation, an on/off state of the brake lamp switch, and an on/off state of the turn signal lamp switch.

The vehicle operation/behavior sensor 35 may provide the driver assistance controller 100 with each piece of the detected information such as the behavior and the speed of the vehicle M and the steering wheel angle of the steering wheel.

(GNSS Antenna)

The GNSS antenna 37 may receive satellite signals from satellites such as GPS (Global Positioning System) satellites, and transmit positional information regarding the vehicle M on map data to the driver assistance controller 10. The positional information is included in the received satellite signals.

It is to be noted that, instead of the GNSS antenna 37, an antenna may be provided that is configured to receive satellite signals from other satellite systems configured to identify the position of the vehicle M.

(Map Data Storage)

The map data storage 33 may include a storage element, or a storage device such as a magnetic disk, an optical disk, or a flash memory, and may be a storage medium configured to hold the map data.

For example, as the storage element, a RAM (Random Access Memory) or a ROM (Read Only Memory) may be used. As the magnetic disk, an HDD (Hard Disk Drive) or the like may be used. As the optical disk, a CD (Compact Disc) or a DVD (Digital Versatile Disc) may be used. As the flash memory, an SSD (Solid State Drive) or a USB (Universal Serial Bus) memory may be used.

The map data storage 33 may provide the map data (including map-related data as well) to the navigation system 39 under the control of a navigation system 39.

It is to be noted that the map data storage 33 of this embodiment may be a storage medium configured to hold the map data to guide the vehicle M to a predetermined destination.

(Navigation System)

The navigation system 39 may cooperate with the map data storage 33 under the control of the driver assistance controller 100, to identify the current position of the vehicle M based on the positional information acquired from the GNSS antenna 37 and provide the identified current position to an HMI (Human Machine Interface) 43.

(HMI)

The HMI 43 may be driven by the driver assistance controller 100, and is configured to notify the driver of various kinds of information by, for example, image display or audio output, e.g., an unillustrated display device and an unillustrated speaker provided in an instrument panel.

For example, the HMI 43 may cooperate with the navigation system 39 to provide image display or audio output of the various kinds of information (image information including map information, and audio information) generated by the navigation system 39 to provide the driver with the driver assistance.

It is to be noted that the display device may be an HUD (head-up display) configured to provide display on a front windshield in superimposition on a landscape around the vehicle M.

(In-Vehicle Camera)

The in-vehicle camera 41 may include an imaging element such as the CCD (Charged-Coupled Devices) or the CMOS (Complementary Metal-Oxide-Semiconductor).

The in-vehicle camera 41 may capture the upper body of the driver including the face of the driver, generate image data, and provide the generated image data to the driver assistance controller 100. The in-vehicle camera 41 is configured to detect a gaze direction of the driver as well.

(Seating Sensor)

The seating sensor 42 may be a sensor incorporated in the driver's seat, and may be a sensor configured to detect a seated state of the driver and estimate an action of the driver and a degree of fatigue of the driver.

In one example, the seating sensor 42 may include sensor sheets provided on a seat and a back of the driver's seat 60. The sensor sheets may each include multiple measurement points.

The seating sensor 42 may provide the driver assistance controller 100 with pressure data related to each of the measurement points.

(Vehicle Driving Controller)

The vehicle driving controller 40 may include one or more control systems configured to control driving of the vehicle M.

The vehicle driving controller 40 may include an engine control system or a motor control system, the electric steering device 15, or the brake devices 17. The engine control system or the motor control system may control a driving force of the vehicle M. The electric steering device 15 may control the steering wheel angle of the steering wheel or the steering angles of the steered wheels. The brake devices 17 may control the braking forces of the vehicle M.

It is to be noted that the vehicle driving controller 40 may include a transmission system. The transmission system may perform shifting of an output outputted from the engine or the driving motor, and transmit the resultant output to driving wheels.

[B2] FORCE SENSE PRESENTER

[B2.1] Sheet-Shaped Force Sense Presenter

Figure 2:
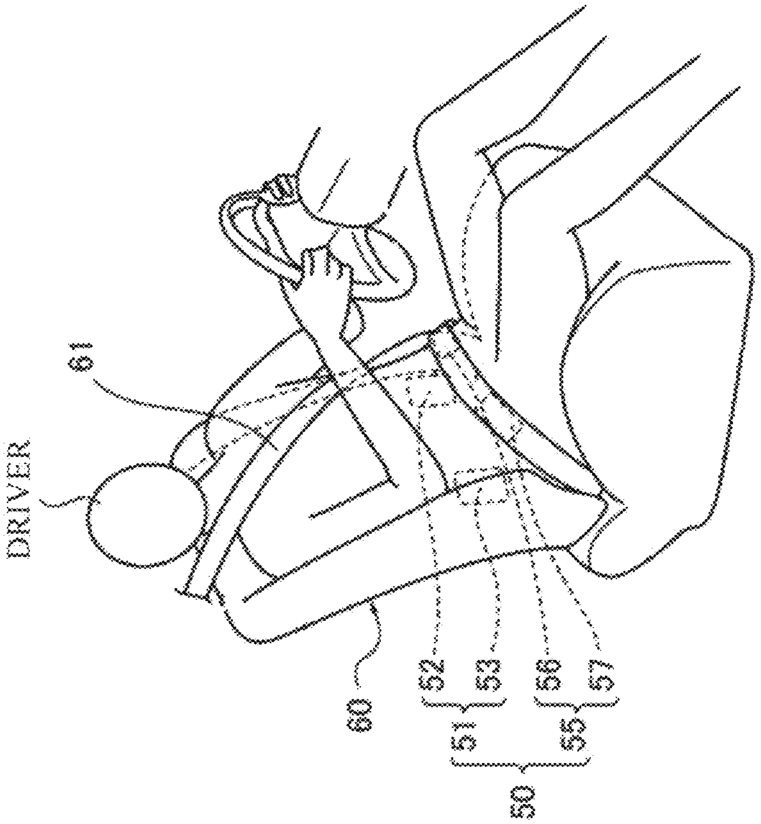
FIG. 2 is a schematic view of a configuration example of a sheet-shaped force sense presenter in the embodiment.

Next, with reference to FIG. 2 together with FIG. 1, a sheet-shaped force sense presenter 50 of the embodiment is described.

It is to be noted that FIG. 2 is an example of a configuration view of a configuration of the sheet-shaped force sense presenter 50 according to the embodiment.

The sheet-shaped force sense presenter 50 may be a device configured to lead a body direction of the driver under the control of the driver assistance controller 100.

The sheet-shaped force sense presenter 50 may be a device provided in the driver's seat 60 including a seat belt 61. The seat belt 61 is configured to be wound up by an unillustrated seat belt winding device.

The sheet-shaped force sense presenter 50 may be a device configured to provide stimulation to a predetermined part of the driver.

For example, the sheet-shaped force sense presenter 50 is configured to control a quantity of stimulation to give a force sense by the stimulation to the body of the driver, and is configured to make a posture control to bring a posture of the driver to a posture suitable for a travel state of the vehicle M.

The seat belt 61 may be provided to be attachable to the driver. One end of the seat belt 61 may be fixed to an unillustrated anchor, and the other end of the seat belt 61 may be windably and pullably coupled to the unillustrated seat belt winding device provided in a pillar or a seat back.

In one example, the sheet-shaped force sense presenter 50 may include a pressing actuator 51. The pressing actuator 51 may include a back pressing actuator 52 and a venter pressing actuator 55 configured to be driven and controlled by the driver assistance controller 100.

The back pressing actuator 52 may be provided, on the back of the seat, inside a seat trim of a back support which the back of the driver comes in contact with.

The back pressing actuator 52 may include a left back side pressing driver 53 and a right back side pressing driver 54 at the same level with a waist belt when the driver wears the seat belt 61.

The left back side pressing driver 53 and the right back side pressing driver 54 may be driven by a motor or by supplying and discharging fluid pressure. On the occasion of pressing driving, the left back side pressing driver 53 and the right back side pressing driver 54 may allow the back of the driver's seat 60 to protrude frontward of the vehicle and press the left and right sides of the back of the driver.

On the occasion of non-pressing driving, the left back side pressing driver 53 and the right back side pressing driver 54 may make the back of the driver's seat 60 flat, and refrain from pressing the right and left sides of the back of the driver.

The venter pressing actuator 55 may be provided on inner side of the waist belt of the seat belt 61, and include a left venter side pressing driver 56 and a right venter side pressing driver 58.

The left venter side pressing driver 56 and the right venter side pressing driver 58 may be displaced in a thickness direction of the waist belt by being shaped as a bag to and from which the fluid pressure is supplied and discharged, or by angular displacement of, for example, a cam-shaped object by a motor or the like.

It is to be noted that, on the occasion of the pressing driving, the left venter side pressing driver 56 and the right venter side pressing driver 58 may protrude rearward of the vehicle to press the right and left sides of the venter of the driver. On the occasion of the non-pressing driving, the left venter side pressing driver 56 and the right venter side pressing driver 58 do not protrude rearward of the vehicle and refrain from pressing the right and left sides of the venter of the driver.

Although the embodiment has been described by using the sheet-shaped force sense presenter 50 as a force sense presenter configured to control the body direction of the driver, the force sense presenter may be a belt-shaped wearable force sense presenter.

[B2.2] Wearable Force Sense Presenter

Figure 3:
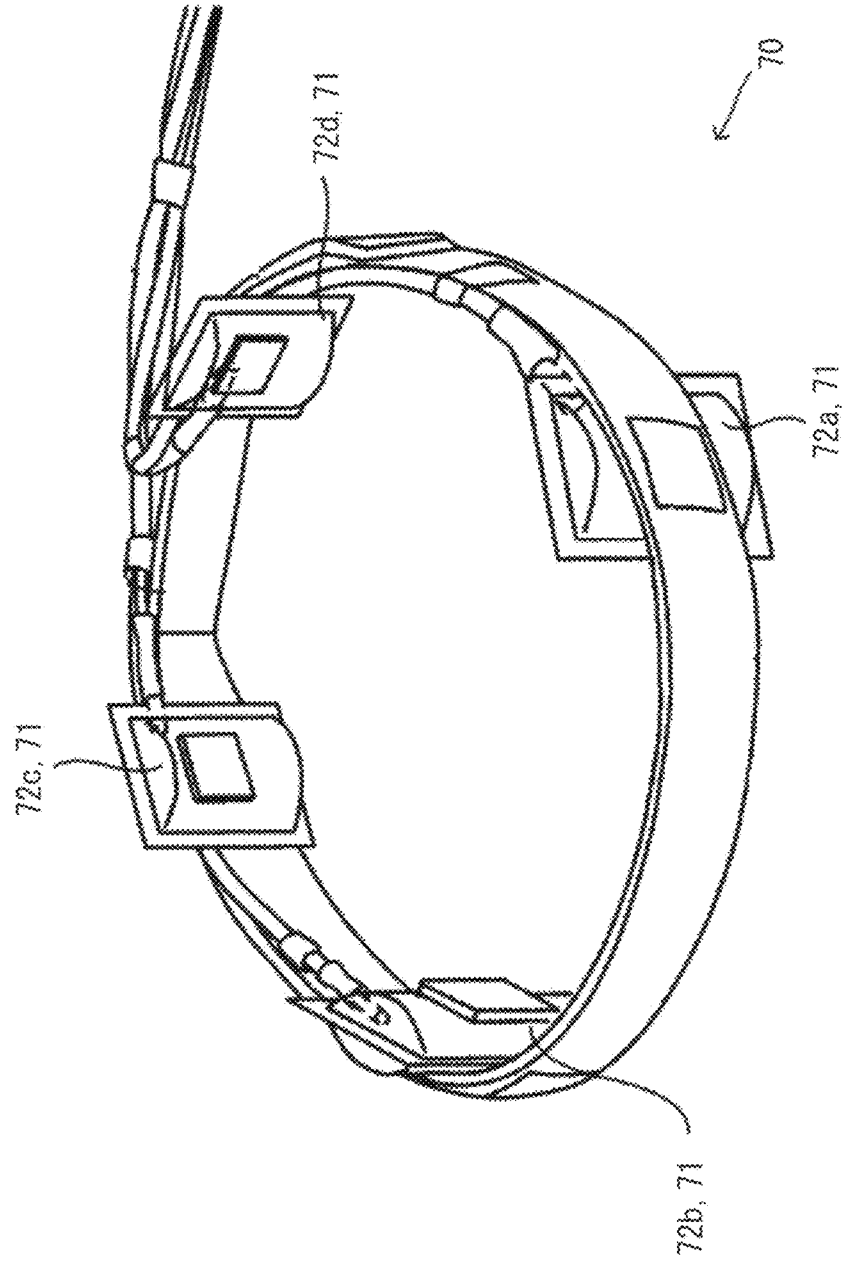
FIG. 3 is a schematic view of a configuration example of a wearable force sense presenter in the embodiment.

Next, with reference to FIG. 3 together with FIG. 1, a wearable force sense presenter 70 of the embodiment is described.

It is to be noted that FIG. 3 is an example of a configuration view of a configuration of the wearable force sense presenter 70 of the embodiment.

The wearable force sense presenter 70 of the embodiment may be a device configured to be attached to the driver to lead a head direction of the driver, under the control of the driver assistance controller 100.

As illustrated in FIG. 3, the wearable force sense presenter 70 of the embodiment may include a stimulation generator 71. The stimulation generator 71 may lead the driver to make a movement in a direction in which the head is turned to the right or to the left.

That is, the stimulation generator 71 may be a device configured to lead the driver to make a motion in a predetermined direction by using different kinds of motion-induced illusion phenomena.

The stimulation generator 71 is configured to be attached to the head of the driver, to lead the head direction.

The stimulation generator 71 may be a device (hanger device) configured to induce, by using a hanger reflex, the driver to make a motion in the direction in which the head is turned to the right or to the left.

The stimulation generator 71 may apply compression and skin deformation to the head of the driver as input stimulation.

In one example, as illustrated in FIG. 3, the stimulation generator 71 may have a wearable shape to be attached to the head and cause the compression and the skin deformation. The stimulation generator 71 may include multiple pneumatic actuators 72 attached at predetermined positions.

Each of the pneumatic actuators 72 is configured to expand by being filled with the air as a fluid, and pressurize a corresponding spot to cause a fine movement of the skin of the driver in a surface direction to induce a swirling motion of the part where the stimulation generator 71 is attached.

It is to be noted that the wearable force sense presenter 70 may include a stimulation generator configured to induce a motion of the head in a different direction from the right-left direction of the head by using the motion-induced illusion phenomena using vision, such as a vision-induced self-motion sensation (vection).

For example, in this case, the wearable force sense presenter 70 may induce a motion of the head in a direction of right-left inclination (direction of rotation around a pitch axis) and in a direction of up-down inclination (direction of rotation around a roll axis) as the different direction from the right-left direction of the head.

Moreover, the wearable force sense presenter 70 may be configured to control a gaze of the driver by giving visual stimulation.

Furthermore, in the embodiment, description is given assuming that the wearable force sense presenter 70 is that which is configured to be attached to the head of the driver. However, the wearable force sense presenter 70 may be a goggle-shaped one such as eyeglasses, a wear-shaped one such as a vest (a jacket without a sleeve), or a belt-shaped one.

[B3] DRIVER ASSISTANCE CONTROLLER

Next, with reference to FIG. 4, description is given of an example of a configuration of the driver assistance controller 100 in the vehicle M of the embodiment. It is to be noted that FIG. 4 is an example of a system configuration diagram of a configuration of the driver assistance controller 100 to be mounted on the vehicle M of the embodiment.

The driver assistance controller 100 may serve as a device configured to assist in driving the vehicle M by executing a computer program by one or more processors such as CPUs.

It is to be noted that the driver assistance controller 100 of the embodiment is not limited to a device mounted on the vehicle M, but may be an information terminal device such as a smartphone or a wearable device configured to cooperate with the vehicle M and communicate with an unillustrated management server.

Moreover, the driver assistance controller 100 may be coupled to the vehicle external imaging camera 31, the surrounding environment sensor 32, and the vehicle operation/behavior sensor 35 directly or through a communicator such as a CAN (Controller Area Network) or a LIN (Local Inter Net).

Furthermore, the driver assistance controller 100 may be coupled to the map data storage 33, the GNSS (Global Navigation Satellite System) antenna 37, and the navigation system 39 through the communicator.

In addition, the driver assistance controller 100 may be coupled to the vehicle driving controller 40, the in-vehicle camera 41, the HMI 43, the sheet-shaped force sense presenter 50, and the wearable force sense presenter 70 through the communicator.

It is to be noted that, in the vehicle M, the vehicle operation/behavior sensor 35, the GNSS antenna 37, the map data storage 33, the HMI 43, and the vehicle driving controller 40 may each be directly coupled to the driver assistance controller 100. However, these may be indirectly coupled to the driver assistance controller 100 through the communicator such as the CAN or the LIN.

In one example, as illustrated in FIG. 4, the driver assistance controller 100 may include a processor 110, an operation inputter 120, a storage 140, a communicator 170, and an information storage medium 180. However, the driver assistance controller 100 may have a configuration in which some of these are omitted.

Moreover, a part or all of the driver assistance controller 100 may include an updatable one such as firmware, or may be a program module or the like to be executed by a command from a CPU or the like.

The processor 110 may drive hardware such as various processors (CPU, DSP, and the like) based on an application program held in the information storage medium 180 to perform each processing in this embodiment.

It is to be noted that any kind of the application program may be held in the information storage medium 180. Moreover, the processor 110 of the embodiment may read out a program or data held in the information storage medium 180, temporarily store the read-out program or data in the storage 140, and perform each processing based on the program or the data.

Furthermore, the processor 110 may perform various kinds of processing by using a main storage 141 in the storage 140 as a work area, or realize the processing by an application program.

In one example, the processor 110 may include a communication controller 111, an operation acceptance processor 112, a driving scene detection processor 113, a driver state detection processor 114, a driver posture controller 115, and a driver posture control information manager 116. However, the processor 110 may have a configuration in which some of these are omitted.

The communication controller 111 may control the communicator 170, establish a communication line with an unillustrated server device through a network N such as a mobile communication network and the Internet, and perform transmission and receipt of data (predetermined digitized information).

The operation acceptance processor 112 may recognize input information inputted from the operation inputter 120 by the driver, and output the recognized information to the driver posture controller 115.

The driving scene detection processor 113 performs driving scene detection processing of detecting a current driving scene in the vehicle M or a driving scene predicted in the future in the vehicle M.

The driver state detection processor 114 performs driver state detection processing of detecting a state of the driver while driving the vehicle M (for example, the head direction, the gaze direction, and a direction in which the body is directed).

Based on the detected driving scene and the detected state of the driver, the driver posture controller 115 repetitively performs, as stimulation output control processing, an output control of the quantity of stimulation in the sheet-shaped force sense presenter 50 and the wearable force sense presenter 70.

That is, upon detecting the driving scene, the driver posture controller 115 may repetitively perform the driver state detection processing and the stimulation output control processing to make a feedback control on the state of the driver.

The driver posture control information manager 116 may perform registration processing of registering the finally adjusted quantity of stimulation in the sheet-shaped force sense presenter 50 and the wearable force sense presenter 70, a period of the stimulation, and the state of the driver before and after an output of the stimulation, in association with the driving scene and the driver.

The operation inputter 120 may be a device to be used when given information is inputted by the driver. The operation inputter 120 is configured to output the information inputted by the driver (hereinafter, referred to as the "input information") to the processor 110.

For example, the operation inputter 120 may include, for example, a lever, a button, a dial operation device, a microphone, a touchscreen display, a keyboard, a mouse, and a camera configured to accept an input by a gesture.

Moreover, the operation inputter 120 may include an unillustrated detector configured to detect the input information (input signal) by the driver.

For example, when the operation inputter 120 includes a microphone, the detector may constitute a voice recognizer configured to accept an input by a voice of an occupant such as the driver. Moreover, when the operation inputter 120 includes a camera, the detector may constitute an image recognizer configured to accept an input by a gesture captured by the camera.

The storage 140 may serve as a work area for the processor 110 and the like. The storage 140 may be realized by hardware such as a RAM (VRAM).

The storage 140 of the embodiment may include the main storage 141, a data storage 142, and a driver posture control information storage 143. The main storage 141 may be used as the work area. However, the storage 140 may have a configuration in which some of these are omitted.

For example, the data storage 142 may hold a computer program to be used when performing each processing, table data, and the like.

Moreover, the driver posture control information storage 143 may hold driver posture control information to control the posture of the driver of the vehicle M by using the sheet-shaped force sense presenter 50 for each driver and for each driving scene.

For example, in the driver posture control information, the finally adjusted stimulation spot, the finally adjusted quantity of stimulation, the finally adjusted period during which the stimulation is given, and the state of the driver before and after the output of the stimulation may be defined for each driver and for each driving scene when force sense presentation to the driver is provided at given timing.

In one example, the driver posture control information storage 143 may hold the driver posture control information in which information (prediction expression) indicating relation between the quantities of stimulation at respective stimulation spots and respective quantities of response are defined for each driver and for each driving scene.

For example, the driver posture control information may be identified by a regression expression (regression model) as information regarding the prediction expression indicating the relation between the quantities of stimulation at the respective stimulation spots and the respective quantities of response (quantities of turning of the head or the body) for each driver and for each driving scene.

Moreover, when the driver posture control information is used in the stimulation output control processing and registered again in the driver posture control information storage 143, the driver posture control information may be newly generated based on the newly determined quantities of stimulation at the respective stimulation spots and the respective quantities of response, or may be updated by using them.

In addition, when the driver posture control information is newly generated, a data update may be made every time the driver posture control information is newly registered, to leave the previously registered driver posture control information as history information.

It is to be noted that the driver posture control information may be the prediction expression indicating the relation between the quantities of stimulation at the multiple stimulation spots and the respective quantities of response. Alternatively, the driver posture control information may include the quantity of stimulation for each stimulation spot and the period during which the stimulation is given (hereinafter referred to as a "stimulation period").

Meanwhile, the driver posture control information storage 143 may hold the driver posture control information in which the quantity of stimulation for each stimulation spot, or the quantity of stimulation and the stimulation period are defined for each driver and for each state of the driver (such as the gaze, the head, and the body).

For example, in this case, when the body of the driver is changed from "front" to "right front", in the driver posture control information, "body: front" before the output of the stimulation, "body: right front" after the output of the stimulation, the stimulation spot "back and venter right side pressing driving", and "level 5 in 10 levels" may be defined.

It is to be noted that the driver posture control information may be defined for each attribute of the driver and for each state of the driver (gaze, head, body, and the like).

The communicator 170 may make various kinds of controls to communicate with outside (for example, the unillustrated server device).

Moreover, the communicator 170 may include hardware such as various processors or a communication ASIC, programs, and the like.

It is to be noted that, when acquiring the driver posture control information held in the unillustrated server device, the communicator 170 of the embodiment may communicate with the unillustrated server device.

The information storage medium 180 may be computer-readable. The information storage medium 180 may hold various kinds of data including an ID corresponding to each of the driver assistance controllers 100, in addition to various kinds of the application programs and an OS (operating system).

That is, the information storage medium 180 may hold, for example, an application program that causes a computer to serve as each unit of the embodiment (an application program that causes a computer to perform the processing of each unit), and the ID to establish communication with the unillustrated server device.

For example, the information storage medium 180 may include a storage element, or a storage device such as a magnetic disk, an optical disk, or a flash memory.

[B4] DRIVER ASSISTANCE CONTROL PROCESSING OF THE EMBODIMENT

[B4.1] Overview

Figure 5:
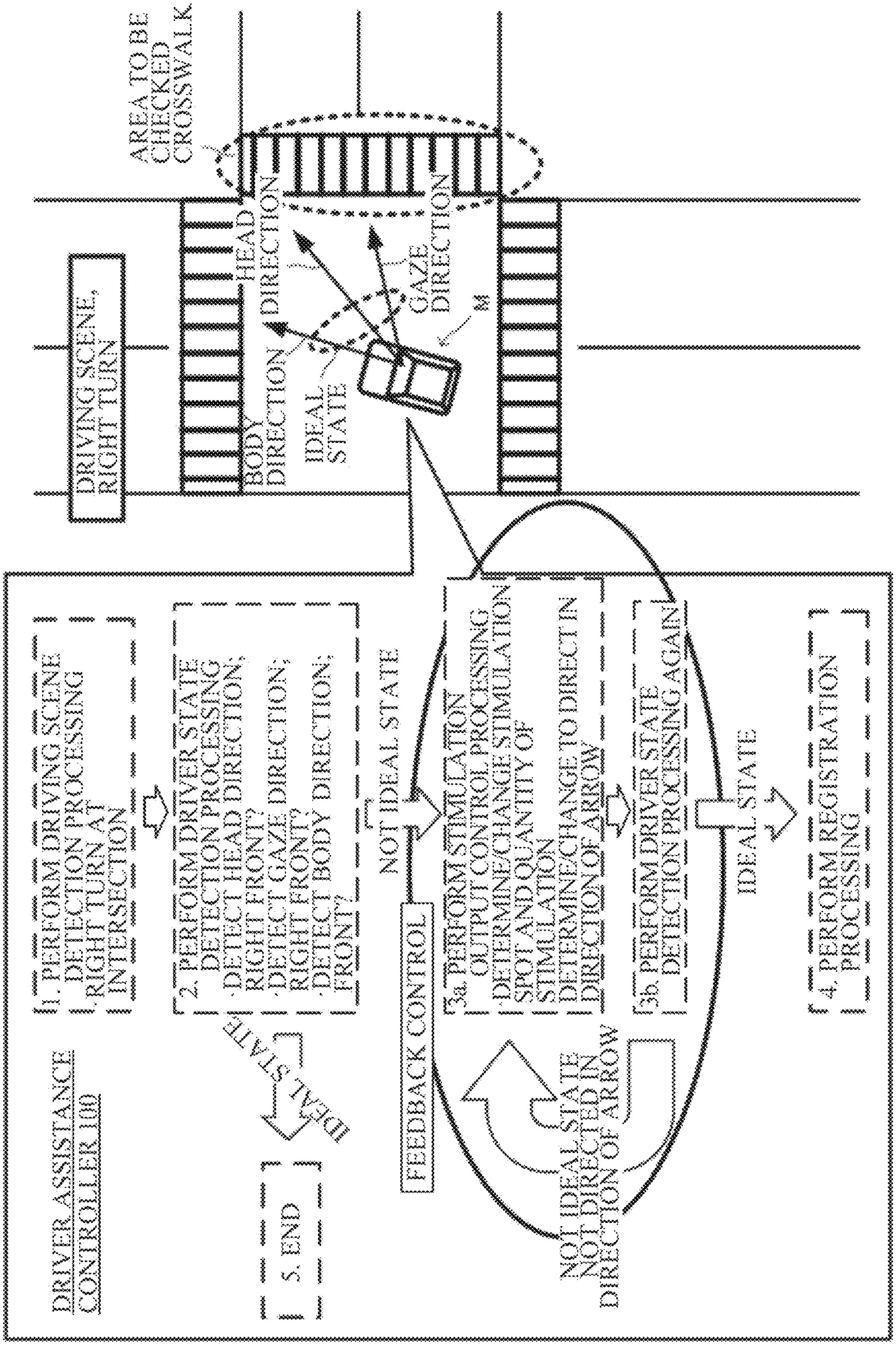
FIG. 5 illustrates driver assistance control processing including a feedback control in stimulation output control processing to be performed by the driver assistance controller according to the embodiment.

Next, with reference to FIG. 5, description is given of driver assistance control processing including the feedback control in the stimulation output control processing to be performed in the driver assistance controller 100 of the embodiment.

It is to be noted that FIG. 5 illustrates the driver assistance control processing including driving condition setting processing according to the embodiment.

The driver assistance controller 100 of the embodiment is configured to perform the driver assistance control processing to accurately lead the driver an appropriate posture by providing the force sense presentation suitable for each driver, and to assist the driver in driving and attain enhancement in the driver's skills.

For example, when a direction of advance of the vehicle M and the state of the driver (i.e., the posture) do not match, there is high possibility that accumulation of fatigue such as "car sickness" is accelerated.

Moreover, for example, when the vehicle M makes a "right turn" at an intersection, to avoid an incident with a pedestrian crossing a crosswalk on the right in the direction of advance of the vehicle M at the intersection, the driver has to visually recognize the direction in which the pedestrian is present.

Thus, the driver assistance controller 100 of the embodiment is configured to lead the driver to an appropriate state when driving the vehicle M, based on each of the driving scene and the state of the driver.

That is, as illustrated in FIG. 5, the driver assistance controller 100 of the embodiment is configured to lead the driver who drives the vehicle M to the appropriate state (head direction, gaze direction, and body direction) in line with each of the driving scene in the vehicle M and the state of the driver.

In one example, the driver assistance controller 100 is configured to perform the driving scene driving processing of detecting the current driving scene in the vehicle M or the driving scene predicted in the future in the vehicle M (Part 1. in FIG. 5).

Moreover, the driver assistance controller 100 is configured to perform the driver state detection processing of detecting the state of the driver (Part 2. in FIG. 5).

Furthermore, the driver assistance controller 100 is configured to repetitively perform, as the stimulation output control processing, the output control of the stimulation by the force sense presenters 50 and 70, while adjusting the quantity of stimulation based on the detected driving scene and the detected state of the driver (Parts 3a. and 3b. in FIG. 5).

For example, upon detecting the driving scene, the driver assistance controller 100 is configured to repeat the driver state detection processing and the stimulation output control processing to make the feedback control on the state of the driver.

Thus, the driver assistance controller 100 is configured to perform the registration processing of registering the finally adjusted quantity of stimulation and the state of the driver before and after the output of the stimulation, in association with the driving scene and the driver (Part 4. in FIG. 5).

It is to be noted that FIG. 5 illustrates an example of the driver assistance control processing to lead the driver to the ideal state when the driving scene is a right turn.

Moreover, FIG. 5 illustrates an example to lead the driver to the ideal state when the state of the driver, e.g., the head direction (right front), the gaze direction (right front), and the body direction (front), is inappropriate based on an area to be checked (the crosswalk on the right in the figure).

FIG. 5 illustrates an example of leading the driver to the ideal state, to make the crosswalk visually recognizable, when the state of the driver is a state in which the crosswalk is visually unrecognizable, and an example of repetitively performing the stimulation output control processing and the driver state detection processing.

With this configuration, it is possible for the driver assistance controller 100 of the embodiment to appropriately change the quantity of stimulation, as compared with the actual state of the driver. Hence, it is possible to continuously lead the driver to an appropriate driving posture.

Moreover, in the driver assistance controller 100 of the embodiment, it is possible to appropriately change the quantity of stimulation, even if the driver is accustomed to the stimulation to control the driving posture of the driver, and even when drivers having different driving characteristics or drivers having different physical constitutions drive.

Thus, in the driver assistance controller 100 of the embodiment, it is possible to lead each driver to the appropriate driving posture. Hence, it is possible to not only suppress car sickness for many drivers but also assist them in driving and enhance their driving skills, leading to safer driving.

[B4.2] Driving Scene Detection Processing

Description is given next of the driving scene detection processing to be performed in the driver assistance controller 100 of the embodiment.

The driving scene detection processor 113 performs the driving scene detection processing of detecting the current driving scene in the vehicle M (hereinafter, referred to as a “current driving scene”) or the driving scene predicted in the future in the vehicle (hereinafter, referred to as a “predicted driving scene”).

For example, the driving scene detection processor 113 may perform vehicle state detection processing of detecting the state of the vehicle M, and detect the current driving scene and the predicted driving scene based on the detected state of the vehicle M (hereinafter, referred to as a “vehicle state”).

That is, the driving scene detection processor 113 is configured to accurately identify the driving scene based on a state of vehicle equipment such as the steering wheel and turn signal lamps (winkers) and based on the travel state and the vehicle state such as the operation state.

Moreover, in addition to the vehicle equipment, the driving scene detection processor 113 may detect the current driving scene or the predicted driving scene in cooperation with any one or more of the vehicle external imaging camera 31, the surrounding environment sensor 32, the vehicle operation/behavior sensor 35, and the navigation system 39.

For example, the driving scene detection processor 113 may detect, as the current driving scene, a scene in which a series of the behavior of the vehicle M is occurring accompanying driving behavior of the driver, e.g., making a right turn or a left turn, parking or stopping the vehicle, making a lane change, or merging.

Moreover, for example, the driving scene detection processor 113 may detect, as the predicted driving scene, a scene in which a series of the behavior of the vehicle M is going to occur accompanying the driving behavior of the driver, e.g., making a right turn or a left turn, parking or stopping the vehicle, making a lane change, or merging.

It is to be noted that the driving scene detection processor 113 may detect, as the current driving scene and the predicted driving scene, a place where the motion of the vehicle has occurred, e.g., an intersection, a merging point, or an expressway.

In one example, the driving scene detection processor 113 may identify travel environment around the vehicle M such as a road shape (straight or curved), presence or absence of any traffic lights and any intersections, or positions of the traffic lights and the intersections, presence or absence of any pedestrians, the number of lanes of a road on which the vehicle is traveling, and the lane on which the vehicle is traveling, based on the information from the vehicle external imaging camera 31, the surrounding environment sensor 32, or both.

Moreover, the driving scene detection processor 113 may identify a driving situation of the vehicle equipment such as the steering wheel angle of the steering wheel, an on/off state of the turn signal lamp for a left turn or the turn signal lamp for a right turn, the speed of the vehicle, presence or absence of operation of the brake devices, and an on/off state of wipers, based on the information from the vehicle operation/behavior sensor 35.

Furthermore, the driving scene detection processor 113 may identify the behavior of the vehicle M such as yaw, pitching, roll, bounce, or vibration, etc. based on the information from the vehicle operation/behavior sensor 35.

In addition to the forgoing, the driving scene detection processor 113 may identify a surrounding situation, and a predicted route of the vehicle M, based on navigation information transmitted from the navigation system 39, e.g., a destination, a route, and a current position.

Thus, the driving scene detection processor 113 may identify the current driving scene or the predicted driving scene based on the travel environment of the vehicle M, the driving situation of the vehicle equipment of the vehicle M, the behavior of the vehicle M, the surrounding situation and the predicted route of the vehicle M that have been identified as described above, and a combination thereof.

For example, when the driving scene detection processor 113 identifies a situation in which the vehicle is going to enter an intersection, based on the travel environment, the driving scene detection processor 113 may identify the vehicle M as making a right turn, based on the on/off state of the turn signal lamps and the route of the vehicle.

At this occasion, the driving scene detection processor 113 may also identify the surrounding situation such as presence or absence of any traffic lights and any crosswalks at the intersection, presence or absence of any pedestrians crossing the crosswalk, and the like.

It is to be noted that, when detecting the driving scene, the driving scene detection processor 113 may detect the driving scene including the area to be checked by the driver, e.g., a crosswalk.

[B4.3] Driver State Detection Processing

Next, description is given of the driver state detection processing to be performed in the driver assistance controller 100 of the embodiment.

The driver state detection processor 114 is configured to acquire the image data from the in-vehicle camera 41 and perform the driver state detection processing of detecting the posture of the driver and the state of the driver (hereinafter, referred to as a “driver state”) such as the action of the driver.

For example, the driver state detection processor 114 may repetitively perform the driver state detection processing at given timing while performing the stimulation output control processing.

In one example, the driver state detection processor 114 may acquire the image data from the in-vehicle camera 41, and detect, based on the image data, the head direction of the driver, a change in the position of the head of the driver, a direction of turning of the body, and the like, as the posture of the driver.

Moreover, the driver state detection processor 114 may detect, based on the image data, an operation of the steering wheel, the gaze direction, a movement of the gaze, and the like, as the action of the driver.

Thus, the driver state detection processor 114 may repetitively detect, based on the image data acquired from the in-vehicle camera 41, the posture of the driver and the driver state such as the action of the driver at the given timing while performing the stimulation output control processing.

Meanwhile, the driver state detection processor 114 may be configured to perform the driver state detection processing of detecting the posture of the driver and the driver state such as the action of the driver based on data from the seating sensor 42.

In this case, the driver state detection processor 114 may detect seating contact pressure distribution of the driver based on the data from the seating sensor 42 (for example, pressure data related to each of the measurement points), and detect the posture and the action of the driver based on the detected seating contact pressure distribution.

For example, the driver state detection processor 114 may detect the direction of turning of the body of the driver as the posture of the driver, and detect an operation state of, for example, a brake pedal or an accelerator pedal.

Thus, the driver state detection processor 114 may repetitively detect the posture and the action of the driver at the given timing while performing the stimulation output control processing based on the seating contact pressure distribution.

[B4.4] Stimulation Output Control Processing Including Feedback Control

Figure 6A:
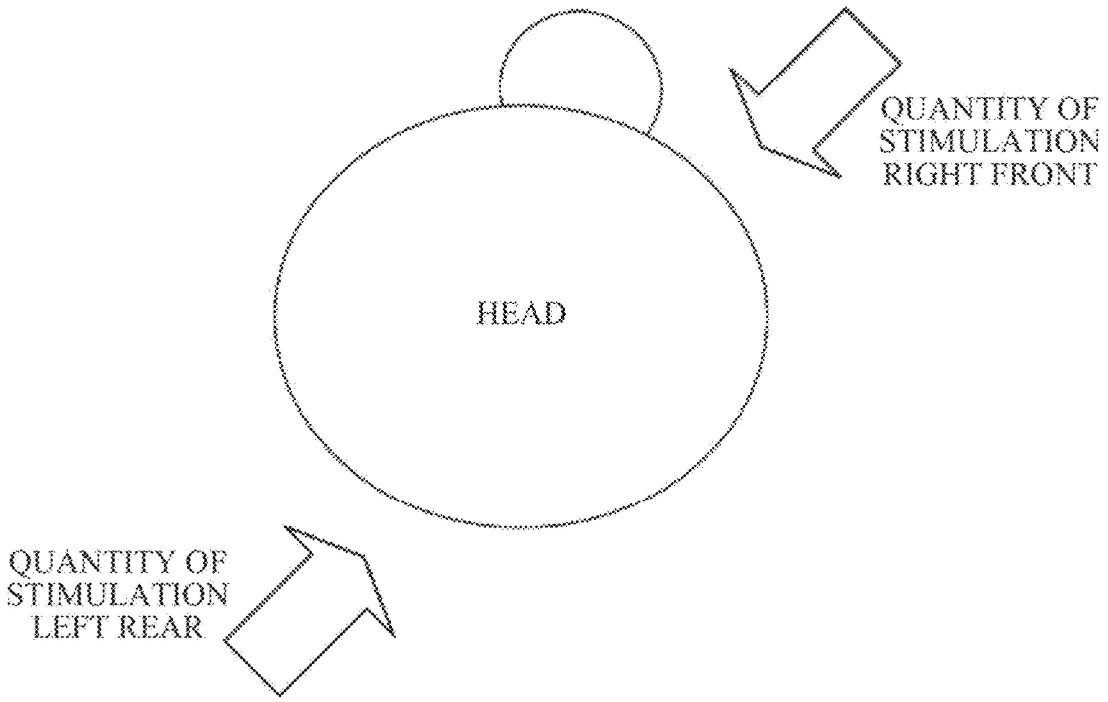
FIG. 6A illustrates the feedback control to be performed in the driver assistance controller according to the embodiment.
Figure 6B:
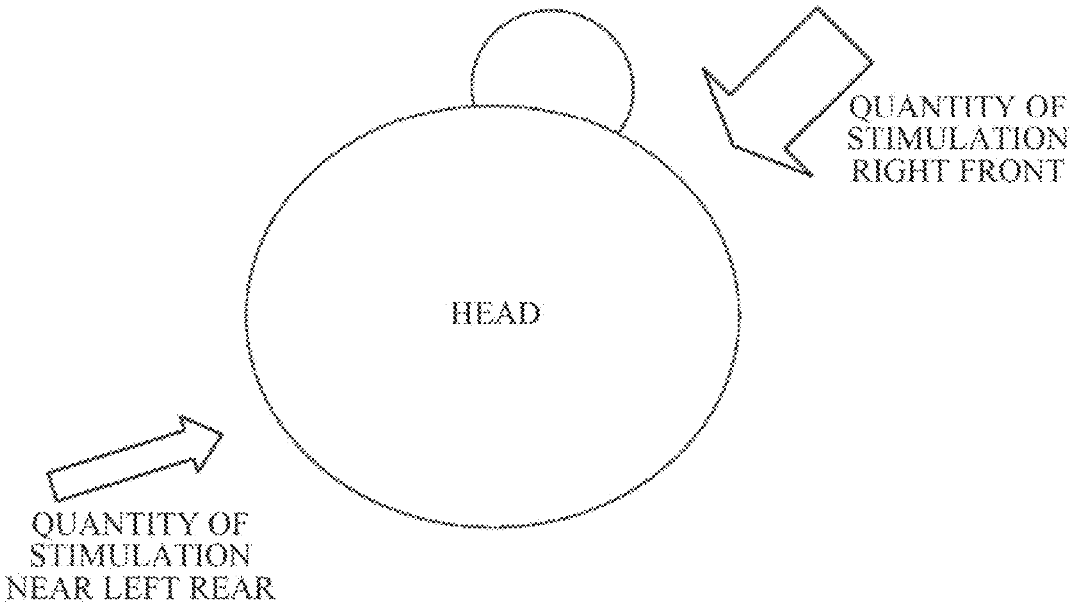
FIG. 6B illustrates the feedback control to be performed in the driver assistance controller according to the embodiment.

Next, with reference to FIGS. 6A and 6B, description is given of the stimulation output control processing including the feedback control to be performed in the driver assistance controller 100 of the embodiment.

It is to be noted that FIGS. 6A and 6B illustrate the feedback control to be made in the driver assistance controller 100 of the embodiment.

(Basic Principle of Stimulation Output Control Processing)

The driver posture controller 115 repetitively performs, as the stimulation output control processing, the output control of the stimulation by the sheet-shaped force sense presenter 50 or the like, while adjusting the quantity of stimulation based on the detected driving scene and the detected driver state.

For example, the driver posture controller 115 may determine whether the driver state is the ideal state in the detected driving scene.

When the driver posture controller 115 determines that the driver state is out of the ideal state, the driver posture controller 115 may present the driver with the stimulation to bring about the appropriate driver state, through the sheet-shaped force sense presenter 50 or the like.

Thus, the driver posture controller 115 may repetitively perform condition determination processing, quantity-of-stimulation determination processing, and stimulation control processing in conjunction with the driving scene detection processing, and make the feedback control (to lead the driver to the ideal state) as the stimulation output control processing until the driver state becomes the ideal state.

In one example, first, as condition identification processing, the driver posture controller 115 may identify a condition (hereinafter, referred to as an "ideal driver state condition") for an ideal driver state (hereinafter, referred to as an "ideal driver state").

Thereafter, the driver posture controller 115 may determine, as the condition determination processing, whether the detected driver state (hereinafter, referred to as a "detected driver state") meets the ideal driver state condition.

When the driver posture controller 115 determines that the detected driver state does not meet the ideal driver state condition, the driver posture controller 115 may determine, as the quantity-of-stimulation determination processing, spots of the driver to which the stimulation is given (hereinafter, referred to as "stimulation spots") and the quantities of stimulation at the respective stimulation spots.

Thereafter, as the stimulation control processing, the driver posture controller 115 may control the sheet-shaped force sense presenter 50, the wearable force sense presenter 70, or both based on the determined stimulation spots and the determined quantities of stimulation at the respective stimulation spots.

Moreover, the driver posture controller 115 may perform again the condition determination processing of determining whether the detected driver state after the stimulation control processing is performed meets the ideal driver state condition.

At this occasion, when the driver posture controller 115 determines that the detected driver state meets the ideal driver state condition, the driver posture controller 115 may end the stimulation output control processing. Otherwise, the driver posture controller 115 may perform the quantity-of-stimulation determination processing and the stimulation control processing again.

Thus, the driver posture controller 115 may repetitively perform the condition determination processing, the quantity-of-stimulation determination processing, and the stimulation control processing in conjunction with the driver state detection processing until the detected driver state meets the ideal driver state condition.

(Condition Identification Processing)

The driver posture controller 115 may identify, as the condition identification processing, the condition (hereinafter, referred to as the "ideal driver state condition") for the ideal driver state (hereinafter, referred to as the "ideal driver state") based on the driving scene detected in the driving scene detection processing.

In one example, the driver posture controller 115 may perform the condition identification processing of identifying the ideal driver state condition by using the table data defined in advance in the data storage 142 and in which the ideal driver state condition is defined for each driving scene.

For example, the driver posture controller 115 may use the table data in which the head direction, the gaze direction, and the direction of turning of the body indicating each element of the driver state are defined for each driving scene.

For example, when a "right turn at an intersection (with a crosswalk)" is detected as the driving scene, the driver posture controller 115 may identify, as the ideal driver state condition, the head direction (right front), the gaze direction (right front and right), and the body direction (front) on the occasion of the right turn.

It is to be noted that, in the detected driving scene, as illustrated in FIG. 5, when the driving scene is detected inclusive of the area to be checked by the driver, e.g., a crosswalk, the driver posture controller 115 may identify, as the ideal driver state condition, the driver state that makes it possible for the driver to visually recognize the area to be checked.

(Condition Determination Processing)

As the condition determination processing, the driver posture controller 115 may determine whether the detected driver state detected in the driver state detection processing meets the ideal driver state condition identified in the condition identification processing.

That is, the driver posture controller 115 is configured to perform determination processing of determining whether the detected driver state is the ideal state defined in advance based on the driving scene.

The driver posture controller 115 may perform the condition identification processing by using the head direction, the gaze direction, and the direction of turning of the body of the driver as conditions to be defined as the detected driver state and the ideal driver state condition (e.g., the ideal driver state).

In one example, the driver posture controller 115 may determine whether the detected driver state (head direction, gaze direction, body direction, and the like) detected in the driver state detection processing matches the ideal driver state condition (head direction, gaze direction, body direction, and the like).

At this occasion, when the detected driver state and the ideal driver state condition match, the driver posture controller 115 may determine that the detected driver state meets the ideal driver state condition, and stop the stimulation output control processing without controlling the sheet-shaped force sense presenter 50.

When the detected driver state and the ideal driver state condition do not match, the driver posture controller 115 may start to perform the quantity-of-stimulation determination processing (that is, feedback control).

For example, let us assume a case where a "right turn at an intersection (with a crosswalk)" has been detected as the driving scene, and the head direction (right front), the gaze direction (right front and right), and the body direction (front) are identified as the ideal driver state.

In this case, the driver posture controller 115 may determine that the detected driver state meets the ideal driver state condition when the head direction (right front), the gaze direction (right front or right), and the direction of turning of the body (front) on the occasion of a right turn are detected as the detected driver state.

Meanwhile, the driver posture controller 115 may determine that the detected driver state does not meet the ideal driver state condition when the head direction (left front), the gaze direction (left), and the body direction (front) on the occasion of a right turn are detected as the detected driver state.

(Quantity-of-Stimulation Determination Processing and Stimulation Control Processing)

When the detected driver state does not meet the ideal driver state condition, the driver posture controller 115 may perform the quantity-of-stimulation determination processing on the target driver by using the driver posture control information held in the driver posture control information storage 143.

In one example, the driver posture controller 115 may detect, from the driver posture control information storage 143, the driver posture control information regarding the target driver in which the detected driver state is assumed to be the driver state before the stimulation and the ideal driver state condition is assumed to be the driver state after the stimulation.

When the driver posture controller 115 detects the relevant driver posture control information, the driver posture controller 115 may determine the stimulation spots and the quantities of stimulation defined in the relevant driver posture control information, as the stimulation spots and the quantities of stimulation to be given to the driver.

Upon determining the stimulation spots and the quantities of stimulation to be given to the driver, the driver posture controller 115 may control the sheet-shaped force sense presenter 50, the wearable force sense presenter 70, or both based on the determined stimulation spots and the determined quantities of stimulation.

For example, let us assume a case where a "right turn at an intersection (with a crosswalk)" is detected as the driving scene, and the detected driver state does not meet the ideal driver condition (head direction (right front), gaze direction (right front and right), and body direction (front)).

Moreover, let us assume a case where the detected driver state is the head direction (left front), the gaze direction (left), the body direction (front), and the following information is defined as the driver posture control information when the head of the driver is to be turned from "left front" to "right front".

(1) Before the output of the stimulation "Head: left front" and after the output of the stimulation "Head: right front"

(2) Stimulation spots "Pneumatic actuators at the right forehead and the left occiput"

(3) Quantities of stimulation "Right: level 5 in 10 levels/ Left: level 2 in 10 levels"

In this case, the driver posture controller 115 may determine, with respect to the wearable force sense presenter 70, that the quantities of stimulation at the right forehead and the left occiput are respectively level 5 in 10 levels and level 2 in 10 levels, to direct the head direction to the right front.

Thus, the driver posture controller 115 may control the wearable force sense presenter 70 in line with the contents of the determination.

Meanwhile, the driver posture controller 115 may determine the stimulation spots and the quantities of stimulation to be given to the driver, based on the attribute of the driver.

In this case, the driver posture controller 115 may identify the attribute of the driver in advance based on information acquired in advance (physical information such as a height or a result of a questionnaire regarding personal characteristics).

Thus, the driver posture controller 115 may search the driver posture control information storage 143 for the driver posture control information based on the attribute of the driver as the target of the driver assistance, and determine the stimulation spots and the quantities of stimulation to be given to the driver based on the relevant driver posture control information.

That is, the driver posture controller 115 may detect, from the driver posture control information storage 143, the driver posture control information regarding a driver having the same attribute as the identified attribute, in which the detected driver state is assumed to be the driver state before the stimulation and the ideal driver state condition is assumed to be the driver state after the stimulation.

Furthermore, when the driver posture controller 115 detects the relevant driver posture control information, the driver posture controller 115 may determine that the stimulation spots and the quantities of stimulation defined in the relevant driver posture control information are assumed to be the stimulation spots and the quantities of stimulation to be given to the driver.

It is to be noted that the attribute of the driver may include, for example, gender, age, personality, the physical information such as a height, a skeleton, and the like, and that which is related to the driver, e.g., a driving style and the sense of burden of driving.

Moreover, the driver posture controller 115 may detect, from the driver posture control information storage 143, not only the driver posture control information regarding a driver having the same attribute as the identified attribute, but also the driver posture control information regarding a driver having an attribute that is regarded as the same as the identified attribute.

That is, the driver posture controller 115 may detect the driver posture control information regarding not only a driver having the same attribute but also a driver having a similar attribute.

For example, the driver posture controller 115 may detect, from the driver posture control information storage 143, the driver posture control information regarding a driver having the attribute of not only the same age but also the same "generation", or a reference age or an age within a certain range (e.g., ±5 years).

As the physical information to be used as the attribute, information automatically collected in advance by the in-vehicle camera 41 or the like may be used. Alternatively, the attribute of the driver may be identified based on the result of the questionnaire filled out in advance by the driver or the like through the operation inputter.

Non-limiting examples of the questionnaire may include not only a questionnaire on attributes of an individual such as age and gender but also a questionnaire on a driving style such as a DSQ (Driving Style Questionnaire), or a questionnaire on sensitivity to a burden of driving such as a WSQ (Workload Sensitivity Questionnaire).

For example, the questionnaire on the driving style may include driving skills, a driving tendency, a tendency of a worrier, and an attitude, a preference, and an approach with which the driver copes with driving. The questionnaire on the sense of mental strain caused by the driving situation may identify various quantitatively evaluated burdens of driving to be sensed by each driver.

(Feedback Control)

The driver posture controller 115 may perform the condition determination processing of determining again whether the detected driver state detected in the driver state detection processing performed after the stimulation control processing is performed meets the ideal driver state condition.

At this occasion, when the detected driver state meets the ideal driver state condition, the driver posture controller 115 may end the stimulation output control processing. When the detected driver state does not meet the ideal driver state condition, the driver posture controller 115 may perform the quantity-of-stimulation determination processing again.

That is, when it is determined in the condition determination processing that the driver state is out of the ideal state, the driver posture controller 115 is configured to adjust the quantities of stimulation to be given to the driver by the sheet-shaped force sense presenter 50 or the like.

Thus, the driver posture controller 115 is configured to repetitively perform the stimulation output control processing of controlling the output of the sheet-shaped force sense presenter 50 or the like, based on the adjusted quantity of stimulation (hereinafter, referred to as "adjusted quantity of stimulation"), together with the driver state detection processing and the condition determination processing.

For example, when performing the stimulation output control processing, the driver posture controller 115 may adjust, as the adjusted quantity of stimulation, the stimulation spots, the quantities of stimulation, or both when the force sense presentation is provided.

For example, let us assume a case where, as illustrated in FIG. 6A, the driver posture controller 115 performs the output control of the equivalent quantities of stimulation at the right front stimulation spot and the left rear stimulation spot of the head by the wearable force sense presenter 70 for the head, to lead the head direction of the driver to the right front.

In this case, when it is determined again in the condition determination processing that the detected driver state does not meet the ideal driver state condition, the driver posture controller 115 may allow the wearable force sense presenter 70 to change the output of the quantities of stimulation.

That is, in this case, as illustrated in FIG. 6B, the driver posture controller 115 may make the output control to allow the wearable force sense presenter 70 to change the left rear stimulation spot to near the left rear and change the quantity of stimulation to a half of the initial quantity.

When performing the quantity-of-stimulation determination processing again, the driver posture controller 115 may allow the driver state detection processor 114 to identify a difference (that is, the quantity of response) in an amount of movement from the previous time, when detecting the driver state.

Thus, finally, the driver posture controller 115 may repetitively perform the condition determination processing, the quantity-of-stimulation determination processing, and the stimulation control processing in conjunction with the driver state detection processing until the detected driver state meets the ideal driver state condition.

[B4.5] Registration Processing

Next, description is given of the registration processing to be performed in the driver assistance controller 100 of the embodiment.

The driver posture control information manager 116 is configured to perform the registration processing of registering the finally adjusted quantity of stimulation, the quantity of response each time the stimulation control processing is performed, and the driver state before and after the output of the stimulation, in association with the driving scene and the driver.

That is, the driver posture control information manager 116 may register a result of the feedback control in association with the driving scene and the driver, to reflect the result of the feedback control in improvement in accuracy of the driver assistance control processing to lead the driver to the ideal state in accompaniment with the force sense presentation from the next time.

In one example, when it is determined that the detected driver state meets the ideal driver state condition, the driver posture control information manager 116 may identify the stimulation spot controlled during the feedback control.

Moreover, the driver posture control information manager 116 may identify the finally adjusted total quantity of stimulation from a start of the feedback control at each of the identified stimulation spots, and the quantity of response of each part of the driver (head, gaze, and body) each time the stimulation control processing is performed.

Moreover, the driver posture control information manager 116 may register, as the driver posture control information, information regarding each stimulation spot, the controlled quantity of stimulation, and the quantity of response of the driver at each stimulation spot, in association with the driver.

For example, when registering the driver posture control information for each driver, the driver posture control information manager 116 may identify the information (prediction expression) indicating the relation between the quantity of stimulation at each stimulation spot and the quantity of response at each stimulation spot, and newly register the identified information as the driver posture control information regarding each driver.

For example, the driver posture control information manager 116 may identify and register the regression expression (regression model) as the information regarding the prediction expression indicating the relation between the quantity of stimulation at each stimulation spot and the quantity of response at each stimulation spot.

Furthermore, the driver posture control information manager 116 may register the driver posture control information to be newly registered, as the driver posture control information regarding each driver, while leaving the previous driver posture control information as the history information.

For example, the driver posture control information manager 116 may register, in the driver posture control information storage 143, the initial detected driver state during the feedback control as the driver state before the output of the stimulation, and the ideal driver state condition as the driver state after the output of the stimulation.

At this occasion, the driver posture control information manager 116 may register the driver posture control information to be newly registered, as the driver posture control information regarding each driver.

Moreover, to enhance accuracy of the feedback control, the driver posture control information manager 116 may register, when registering the driver posture control information, information regarding a total quantity of stimulation at each stimulation spot and the quantity of response at each stimulation spot, as the information indicating the relation such as the regression expression (regression model).

Furthermore, the driver posture control information manager 116 may register the driver posture control information to be newly registered, as the driver posture control information regarding each driver, while leaving the previous driver posture control information as the history information.

It is to be noted that the driver posture control information manager 116 may register the driver posture control information to be newly registered, in the driver posture control information storage 143 for each predetermined attribute, instead of or in addition to each driver.

It is to be noted that the driver posture control information manager 116 may register the finally adjusted quantity of stimulation, the quantity of response each time the stimulation control processing is performed, and the driver state before and after the output of the stimulation, in association with the different driving scenes.

For example, when the feedback control is finally realized with the constantly small quantity of stimulation at the stimulation spots in some directions, the driver posture control information manager 116 may determine the relevant quantity of stimulation as the quantity of stimulation in other driving scenes.

[B5] OPERATION IN THE EMBODIMENT

Figure 7:
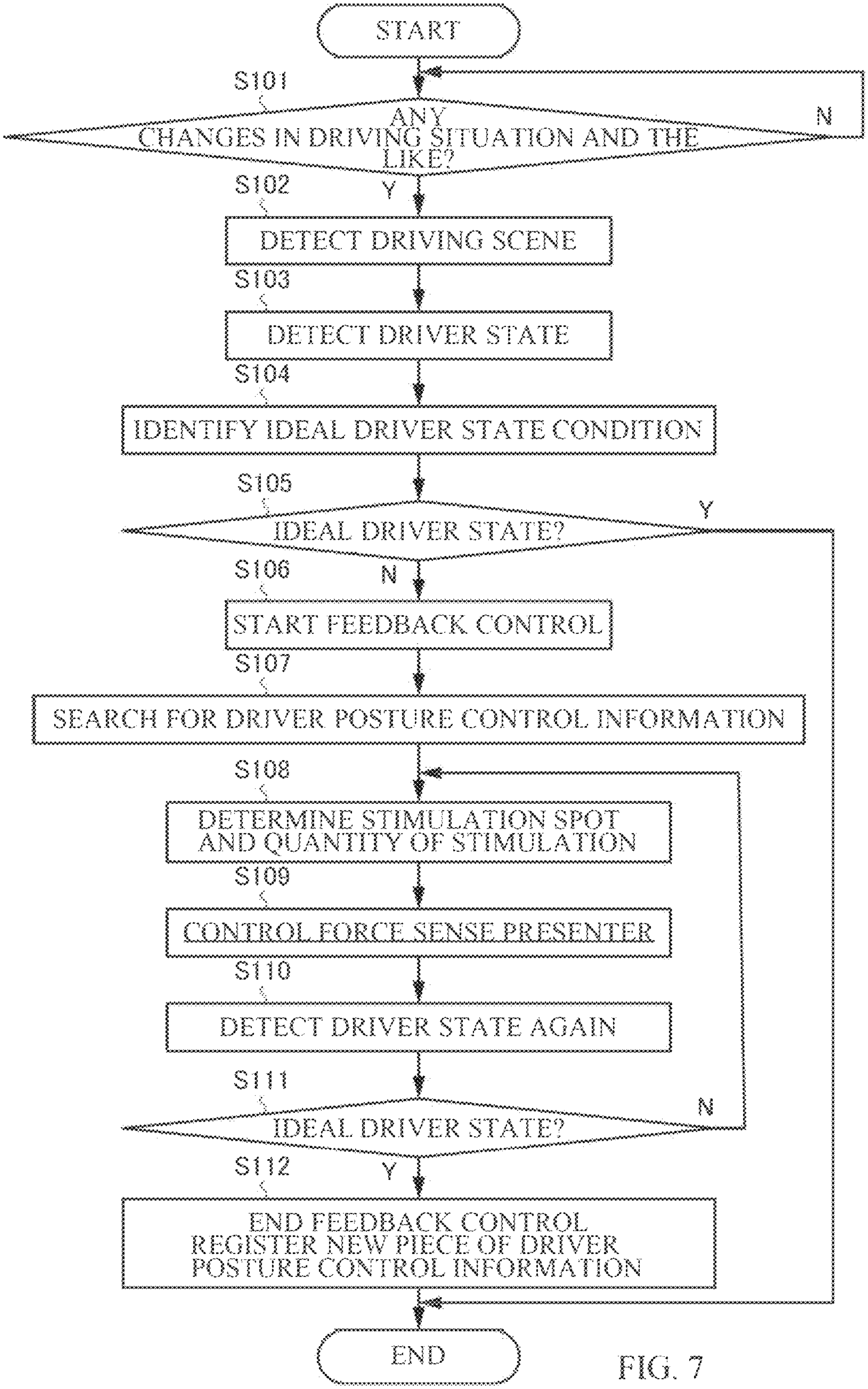
FIG. 7 is a flowchart of operation of the driver assistance control processing including the feedback control in the stimulation output control processing to be performed by the driver assistance controller according to the embodiment.

Next, with reference to FIG. 7, description is given of the driver assistance control processing including the feedback control in the stimulation output control processing to be performed in the driver assistance controller 100 of the embodiment.

It is to be noted that FIG. 7 is a flowchart of operation of the driver assistance control processing including the feedback control in the stimulation output control processing to be performed in the driver assistance controller 100 of the embodiment.

In this operation, it is assumed that the driver posture control information has been already registered in the driver posture control information storage 143 for each driving scene and for each driver.

First, upon detecting predetermined changes in the driving situation of the driver and the travel environment of the vehicle M (step S101), the driving scene detection processor 113 may perform the driving scene detection processing of detecting the driving scene of the vehicle M (step S102).

For example, the driving scene detection processor 113 may detect the change in the driving situation or the travel environment when occurrence of a right turn or a left turn at a next intersection is detected by the navigation system 39, or when an operation of the turn signal lamp for a right turn or a left turn is detected by the vehicle operation/behavior sensor 35.

Thereafter, the driver state detection processor 114 may acquire the image data from the in-vehicle camera 41, and perform the driver state detection processing of detecting the posture of the driver and the driver state such as the action of the driver (step S103).

For example, the driver state detection processor 114 may detect the head direction, the gaze direction, and the body direction of the driver as the posture of the driver.

Thereafter, the driver posture controller 115 may identify the ideal driver state condition based on the driving scene detected in the driving scene detection processing by using the table data or the like (step S104).

Thereafter, the driver posture controller 115 may perform the condition determination processing of determining whether the detected driver state meets the ideal driver state condition (step S105).

That is, the driver posture controller 115 may determine whether the detected driver state (such as the head direction) detected in the driver state detection processing and the ideal driver state condition (such as the head direction) match.

At this occasion, when the driver posture controller 115 determines that the detected driver state and the ideal driver state condition match, the driver posture controller 115 may determine that the detected driver state meets the ideal driver state condition and end the operation.

When the driver posture controller 115 determines that the detected driver state and the ideal driver state condition do not match, the driver posture controller 115 may start to perform the quantity-of-stimulation determination processing and start the feedback control (step S106).

First, the driver posture controller 115 may search the driver posture control information storage 143 for the driver posture control information regarding the target driver in which the detected driver state is assumed to be the driver state before the stimulation and the ideal driver state condition is assumed to be the driver state after the stimulation (step S107).

Thereafter, the driver posture controller 115 may perform the quantity-of-stimulation determination processing of determining that the stimulation spots and the quantities of stimulation defined in the relevant driver posture control information are assumed to be the stimulation spots and the quantities of stimulation to be given to the driver (step S108).

Thereafter, the driver posture controller 115 may control the sheet-shaped force sense presenter 50, the wearable force sense presenter 70, or both, based on the determined stimulation spots and the determined quantities of stimulation (step S109).

Thereafter, the driver state detection processor 115 may perform again the driver state detection processing of detecting the posture of the driver and the driver state such as the action of the driver (step S110).

Thereafter, the driver posture controller 115 may perform again the condition determination processing of determining whether the driver state detected again meets the ideal driver state condition (step S111).

When the driver posture controller 115 determines that the detected driver state and the ideal driver state condition do not match, the driver posture controller 115 may cause the flow to return to the process in step S108.

When the driver posture controller 115 determines that the detected driver state and the ideal driver state condition match, the driver posture controller 115 may end the feedback control, register a new piece of the driver posture control information such as the finally adjusted quantity of stimulation (step S112), and end the operation.

That is, the driver posture control information manager 116 may register, as the driver posture control information, the finally adjusted quantity of stimulation, the quantity of response each time the stimulation control processing is performed during the feedback control, and the driver state before and after the output of the stimulation, in association with the driving scene and the driver.

[B6] MODIFICATION EXAMPLES

[B6.1] Modification Example 1

Description is given next of a case where, in Modification Example 1 of the embodiment, machine-learned model data is used for the driver posture control information.

The driver posture control information as the model data may be information generated based on machine learning such as a support vector machine or a neural network (including deep learning) that uses multiple pieces of the driver posture control information as teacher data.

That is, in this case, the driver posture control information may be formed as model data generated with respect to the stimulation spot and the quantity of stimulation (which may include the stimulation period) for each driver or for each attribute of the driver, and for each driver state or for each driving scene.

In one example, the driver posture control information may be learned based on a new piece of information each time the force sense presentation is provided to the driver.

For example, the driver posture control information as the model data may use, as the input information, the stimulation spot and the quantity of stimulation (which may include the stimulation period) provided by the previous force sense presentation, the posture of the driver after the force sense presentation (an amount of change accompanying a change in the head direction or the body direction), and a difference between the posture of the driver and the ideal state.

When the input information mentioned above is inputted, as the driver posture control information, the stimulation spot and the quantity of stimulation (which may include the stimulation period) may be outputted.

It is to be noted that the driver posture control information may be further learned based on the output of the new stimulation spot and the new quantity of stimulation, and the input information inputted when outputting the new stimulation spot and the new quantity of stimulation.

Moreover, the driver posture control information may be learned based on the same driving scene, or based on the same driver or the same attribute of drivers. Alternatively, the driver posture control information may be learned based on the related driving scenes or the different driving scenes, or based on the related attributes of drivers.

For example, in this case, in the driving scene of a right turn, when decreasing the quantity of stimulation in the force sense presentation makes it possible to lead the driver to the ideal state in an early stage, it is possible to similarly decrease the quantity of stimulation in the driving scene of a left turn.

[B6.2] Modification Example 2

Description is given next of a case where, in Modification Example 2 of the embodiment, the driver posture control information is provided from the unillustrated server device.

The driver posture controller 115 of the modification example may be coupled to the unillustrated server device through the communicator 170 and acquire the driver posture control information from the server device, under the control of the communication controller 111.

In this case, the driver posture control information manager 116 may register the finally adjusted quantity of stimulation, the quantity of response each time the stimulation control processing is performed, and the driver state before and after the output of the stimulation, in the unillustrated server device in association with the driving scene and the driver.

[B6.3] Modification Example 3

Description is given next of a case including leading the driver to the ideal state in consideration of the degree of fatigue of the driver in Modification Example 3 of the embodiment.

In this case, an unillustrated seating sensor may be provided on the driver's seat 60. The driver posture controller 115 may detect the seating contact pressure distribution of the driver, and detect the degree of fatigue of the driver as the driver state based on the detected seating contact pressure distribution.

Thus, the driver posture controller 115 may lead the driver to the ideal state by using the detected driver state including the degree of fatigue, in a similar manner to the forgoing description.

For example, in this case, in performing the stimulation output control processing, when the degree of fatigue is higher than normal, the driver posture controller 115 may change the quantity of stimulation in accordance with the degree of fatigue, for example, by increasing the quantity of stimulation more than normal.

[C] OTHER

The embodiments of the disclosure are not limited to those described in the forgoing embodiments, but various modifications may be made. For example, as for terms cited as broad or synonymous terms in a statement in the specification or the drawings, replacements may be made with the broad or synonymous terms in other statements in the specification or the drawings.

Embodiments of the disclosure include substantially the same configurations as the configurations described in the forgoing embodiments (for example, configurations having the same function, method, and result, or configurations having the same object and effects). Moreover, the embodiments of the disclosure include configurations in which non-essential portions of the configurations described in the forgoing embodiments are replaced. Furthermore, the embodiments of the disclosure include a configuration that makes it possible to produce the same workings and effects as the configuration described in the forgoing embodiments, or a configuration that makes it possible to achieve the same object. In addition, the embodiments of the disclosure include a configuration in which known techniques are added to the configurations described in the forgoing embodiments.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The driver assistance controller 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driver assistance controller 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driver assistance controller 100 illustrated in FIG. 1.

The invention claimed is:

1. A driver assistance system configured to control a force sense presenter that gives, by stimulation, a force sense to a body of a driver, control a quantity of stimulation, and assist the driver in driving a vehicle, the driver assistance system comprising:

one or more processors; and one or more memories communicably coupled to the one or more processors, wherein the one or more processors are configured to;

perform driving scene detection processing of detecting, as a detected driving scene, a current driving scene of the vehicle or a future driving scene predicted in future in for the vehicle, the detected driving scene being a motion of the vehicle accompanying driving behavior of the driver, the motion including at least one of a left turn, a right turn, parking or stopping of the vehicle, a lane change, or merging;

perform driver state detection processing of detecting, as a detected state of the driver, a state of the driver, the detected state of the driver including a head direction, a gaze direction, and a body direction of the driver;

repetitively perform, as stimulation output control processing, control of output of the stimulation by the force sense presenter while adjusting the quantity of stimulation based on the detected driving scene and the detected state of the driver, wherein the repetitive performance includes detecting the state of the driver after output of the stimulation and further adjusting the quantity of stimulation based on the detected state of the driver after output of the stimulation; and perform registration processing of registering, in the one or more memories in association with the detected driving scene and the driver, the quantity of stimulation finally adjusted by repetitive performance of the driver state detection processing and the stimulation output control processing, an initial state of the driver detected before a first output of the stimulation in the repetitive performance, and a final state of the driver detected after a last output of the stimulation in the repetitive performance.

2. The driver assistance system according to claim 1, wherein the one or more processors are configured to;

perform determination processing of determining whether the detected state of the driver is an ideal state of the driver defined in advance based on the detected driving scene; and when it is determined in the determination processing that the detected state of the driver is not the ideal state, repetitively perform the driver state detection processing, the determination processing, and the stimulation output control processing, wherein the stimulation output control processing includes adjusting the quantity of stimulation to be given to the driver by the force sense presenter, and controlling output of the stimulation by the force sense presenter based on the adjusted quantity of stimulation.

3. The driver assistance system according to claim 2, wherein the one or more memories hold the ideal state of the driver in association with the detected driving scene, for each driver or for each attribute of the driver, and the one or more processors are configured to, when it is determined in the determination processing that the detected state of the driver is not the ideal state, perform the stimulation output control processing based on the detected driving scene and the ideal state held in association with the driver or the attribute of the driver.

4. The driver assistance system according to claim 1, wherein the one or more processors are configured to:

perform vehicle state detection processing of detecting, as a detected state of the vehicle, a state of the vehicle, and perform the driving scene detection processing based on the detected state of the vehicle.

5. The driver assistance system according to claim 1, wherein the one or more processors are configured to perform the driving scene detection processing based on an operation of a turn signal lamp or navigation information indicating that a right turn or a left turn is to occur at a next intersection.

6. The driver assistance system according to claim 1, wherein the detected driving scene includes a right turn at an intersection with a crosswalk, and the one or more processors are configured to set, as an ideal driver state condition for the detected driving scene, a head direction toward a right front, a gaze direction toward the right front and right, and a body direction toward a front.

7. The driver assistance system according to claim 1, wherein the force sense presenter includes a wearable force sense presenter including pneumatic actuators at a right forehead and a left occiput of the driver, and the one or more processors are configured to determine quantities of stimulation for the pneumatic actuators to change a head direction of the driver from a left front to a right front.

8. The driver assistance system according to claim 1, wherein the one or more processors are configured to register, in the one or more memories, information indicating a relation between the quantity of stimulation at each stimulation spot and a quantity of response of the driver at the stimulation spot.

9. A vehicle provided with a driver assistance system configured to control a force sense presenter that gives, by stimulation, a force sense to a body of a driver, control a quantity of stimulation, and assist the driver in driving the vehicle, the driver assistance system comprising:

one or more processors; and one or more memories communicably coupled to the one or more processors, wherein the one or more processors are configured to:

perform driving scene detection processing of detecting, as a detected driving scene, a current driving scene of the vehicle or a future driving scene predicted for the vehicle, the detected driving scene being a motion of the vehicle accompanying driving behavior of the driver, the motion including at least one of a left turn, a right turn, parking or stopping of the vehicle, a lane change, or merging;

perform driver state detection processing of detecting, as a detected state of the driver, a state of the driver, the detected state of the driver including a head direction, a gaze direction, and a body direction of the driver;

repetitively perform, as stimulation output control processing, control of output of the stimulation by the force sense presenter while adjusting the quantity of stimulation based on the detected driving scene and the detected state of the driver, wherein the repetitive performance includes detecting the state of the driver after output of the stimulation and further adjusting the quantity of stimulation based on the detected state of the driver after output of the stimulation; and perform registration processing of registering, in the one or more memories in association with the detected driving scene and the driver, the quantity of stimulation finally adjusted by repetitive performance of the driver state detection processing and the stimulation output control processing, an initial state of the driver detected before a first output of the stimulation in the repetitive performance, and a final state of the driver detected after a last output of the stimulation in the repetitive performance.

10. A non-transitory computer-readable recording medium containing a program for a driver assistance system configured to control a force sense presenter that gives, by stimulation, a force sense to a body of a driver, control a quantity of stimulation, and assist the driver in driving a vehicle, the program causing, when executed by a computer, the computer to implement a method, the method comprising:

performing driving scene detection processing of detecting, as a detected driving scene, a current driving scene of the vehicle or a future driving scene predicted for the vehicle, the detected driving scene being a motion of the vehicle accompanying driving behavior of the driver, the motion including at least one of a left turn, a right turn, parking or stopping of the vehicle, a lane change, or merging;

performing driver state detection processing of detecting, as a detected state of the driver, a state of the driver, the detected state of the driver including a head direction, a gaze direction, and a body direction of the driver;

repetitively performing, as stimulation output control processing, control of output of the stimulation by the force sense presenter while adjusting the quantity of stimulation based on the detected driving scene and the detected state of the driver, wherein the repetitive performance includes detecting the state of the driver after output of the stimulation and further adjusting the quantity of stimulation based on the detected state of the driver after output of the stimulation; and performing registration processing of registering, in one or more memories in association with the detected driving scene and the driver, the quantity of stimulation finally adjusted by repetitive performance of the driver state detection processing and the stimulation output control processing, an initial state of the driver detected before a first output of the stimulation in the repetitive performance, and a final state of the driver detected after a last output of the stimulation in the repetitive performance.

11. A driver assistance method including controlling a force sense presenter that gives, by stimulation, a force sense to a body of a driver, controlling a quantity of stimulation, and assisting the driver in driving a vehicle, the driver assistance method comprising:

performing driving scene detection processing of detecting, as a detected driving scene, a current driving scene of the vehicle or a future driving scene predicted for the vehicle, the detected driving scene being a motion of the vehicle accompanying driving behavior of the driver, the motion including at least one of a left turn, a right turn, parking or stopping of the vehicle, a lane change, or merging;

performing driver state detection processing of detecting, as a detected state of the driver, a state of the driver, the detected state of the driver including a head direction, a gaze direction, and a body direction of the driver;

repetitively performing, as stimulation output control processing, control of output of the stimulation by the force sense presenter while adjusting the quantity of stimulation based on the detected driving scene and the detected state of the driver, wherein the repetitive performance includes detecting the state of the driver after output of the stimulation and further adjusting the quantity of stimulation based on the detected state of the driver after output of the stimulation; and performing registration processing of registering, in one or more memories in association with the detected driving scene and the driver, the quantity of stimulation finally adjusted by repetitive performance of the driver state detection processing and the stimulation output control processing, an initial state of the driver detected before a first output of the stimulation in the repetitive performance, and a final state of the driver detected after a last output of the stimulation in the repetitive performance.

12. A driver assistance system configured to control a quantity of stimulation and control a force sense presenter configured to give a force sense by stimulation to a body of a driver, and assist the driver in driving a vehicle, the driver assistance system comprising:

one or more processors; and one or more memories communicably coupled to the one or more processors, wherein the one or more processors are configured to:

perform driving scene detection processing of detecting a current driving scene in the vehicle or a driving scene predicted in future in the vehicle;

perform driver state detection processing of detecting a state of the driver;

repetitively perform, as stimulation output control processing, an output control of the stimulation by the force sense presenter, while adjusting the quantity of stimulation based on the detected driving scene and the detected state of the driver;

perform registration processing of registering the quantity of stimulation finally adjusted by repetitively performing the driver state detection processing and the stimulation output control processing, and the state of the driver before and after an output of the stimulation, in the one or more memories in association with the driving scene and the driver;

perform determination processing of determining whether the detected state of the driver is an ideal state defined in advance based on the driving scene; and repetitively perform, when it is determined in the determination processing that the detected state of the driver is out of the ideal state, the stimulation output control processing together with the driver state detection processing and the determination processing, the stimulation output control processing including adjusting the quantity of stimulation to be given to the driver by the force sense presenter, and controlling the output of the force sense presenter based on the adjusted quantity of stimulation, and wherein, in a case where the ideal state is held in the one or more memories in association with the driving scene, for each driver or for each attribute of the driver, the one or more processors are configured to, when it is determined in the determination processing that the detected state of the driver is out of the ideal state, perform the stimulation output control processing based on the ideal state of the driver as a target of driver assistance or the ideal state held in association with the attribute of the driver, and the detected driving scene.

* * * * *